US011915588B2

(12) United States Patent
Tsubakimoto et al.

(10) Patent No.: US 11,915,588 B2
(45) Date of Patent: Feb. 27, 2024

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Tatsuya Tsubakimoto, Nagoya (JP); Tomohiro Hikosaka, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 17/659,112

(22) Filed: Apr. 13, 2022

(65) Prior Publication Data
US 2022/0327931 A1    Oct. 13, 2022

(30) Foreign Application Priority Data

Apr. 13, 2021   (JP) .................................. 2021-067449

(51) Int. Cl.
*G08G 1/14*    (2006.01)
*H04W 4/021*   (2018.01)
*H04W 4/48*    (2018.01)

(52) U.S. Cl.
CPC ............ *G08G 1/144* (2013.01); *H04W 4/021* (2013.01); *H04W 4/48* (2018.02)

(58) Field of Classification Search
None
See application file for complete search history.

(56) References Cited

U.S. PATENT DOCUMENTS

| 2012/0166240 A1* | 6/2012 | Jones | G06Q 10/0631 |
| | | | 709/227 |
| 2016/0180712 A1* | 6/2016 | Rosen | G08G 1/147 |
| | | | 705/5 |
| 2019/0200186 A1* | 6/2019 | Clemente | H04W 4/44 |
| 2021/0133603 A1* | 5/2021 | Zhu | G06N 5/04 |

FOREIGN PATENT DOCUMENTS

| CN | 108898879 A | 11/2018 |
| CN | 110060494 A | 7/2019 |
| CN | 110111597 A | 8/2019 |
| JP | 2005-117150 A | 4/2005 |
| JP | 2013-061270 A | 4/2013 |
| JP | 2019-128844 A | 8/2019 |
| JP | 2019-163968 A | 9/2019 |
| JP | 2020-038461 A | 3/2020 |
| JP | 2020-166428 A | 10/2020 |
| JP | 2020-166459 A | 10/2020 |

* cited by examiner

*Primary Examiner* — Thomas S McCormack
(74) *Attorney, Agent, or Firm* — Oblon, McClelland, Maier & Neustadt, L.L.P.

(57) ABSTRACT

An information processing system includes a terminal worn by a user riding on a vehicle or a terminal on the vehicle, and an information processing apparatus. The terminal acquires position information. The information processing apparatus includes a processor configured to acquire the position information acquired by the terminal as position information of the vehicle, and identify a first parking slot in which the vehicle is parked from the position information of a plurality of parking slots included in a parking lot and the position information of the vehicle. The terminal worn by the user or the terminal on the vehicle acquires the position information by using a first signal from a first satellite and a second signal from a second satellite.

17 Claims, 15 Drawing Sheets

FIG. 4

PARKING LOT INFORMATION DATABASE

| SITE ID | PARKING SLOT ID | REPRESENTATIVE COORDINATE |
|---|---|---|
|  |  |  |
|  |  |  |
|  |  |  |

VEHICLE LOCATION INFORMATION DATABASE

| VEHICLE ID | SITE ID | PARKING SLOT ID | VEHICLE NAME | MODEL | VEHICLE BODY COLOR |
|---|---|---|---|---|---|
|  |  |  |  |  |  |
|  |  |  |  |  |  |
|  |  |  |  |  |  |

⋮

INFORMATION PROCESSING APPARATUS, INFORMATION PROCESSING SYSTEM, AND INFORMATION PROCESSING METHOD

CROSS REFERENCE TO RELATED APPLICATION

This application claims the benefit of Japanese Patent Application No. 2021-067449, filed on Apr. 13, 2021, which is hereby incorporated by reference herein in its entirety.

BACKGROUND

Technical Field

The present disclosure relates to an information processing apparatus, an information processing system, and an information processing method.

Description of the Related Art

The technique, if determining that a user has got out a vehicle, updates and records position information at that time positioned by the GPS (Global Positioning System) positioning function as a parking position, to present the user is disclosed (e.g., Patent Document 1).

CITATION LIST

Patent Document

[Patent document 1] Japanese Patent Laid-Open No. 2019-163968

An object of the present disclosure is to provide an information processing apparatus, an information processing system, and an information processing method capable of identifying a parking slot of a vehicle in a parking lot.

SUMMARY

An aspect of the present disclosure is an information processing apparatus including a processor configured to:

acquire position information acquired by a terminal worn by a user on a vehicle or by a terminal on the vehicle as position information of the vehicle, and identify a first parking slot in which the vehicle is parked based on a plurality of pieces of position information of a parking slot for each of a plurality of parking slots included in a parking lot and the position information of the vehicle.

Another aspect of the present disclosure is an information processing system including:

a terminal worn by a user on a vehicle or a terminal on the vehicle, each of which acquires position information, an information processing apparatus including a processor configured to:

acquire the position information as position information of the vehicle, and identify a first parking slot in which the vehicle is parked based on a plurality of pieces of position information of a parking slot for each of a plurality of parking slots included in the parking lot and the position information of the vehicle.

Another aspect of the present disclosure is an information processing method executed by a computer, including:

acquiring position information acquired by a terminal worn by a user on a vehicle or a terminal on the vehicle as position information of the vehicle, and identifying a first parking slot in which the vehicle is parked based on a plurality of pieces of position information of a parking slot for each of a plurality of parking slots included in a parking lot and the position information of the vehicle.

According to the present disclosure, it is possible to identify the parking slot of the vehicle in the parking lot.

BRIEF DESCRIPTION OF DRAWINGS

FIG. 4 illustrates exemplary information held in a parking lot information database;

FIG. 6 illustrates exemplary information held in a vehicle location information database;

DESCRIPTION OF THE EMBODIMENTS

Figure 1:
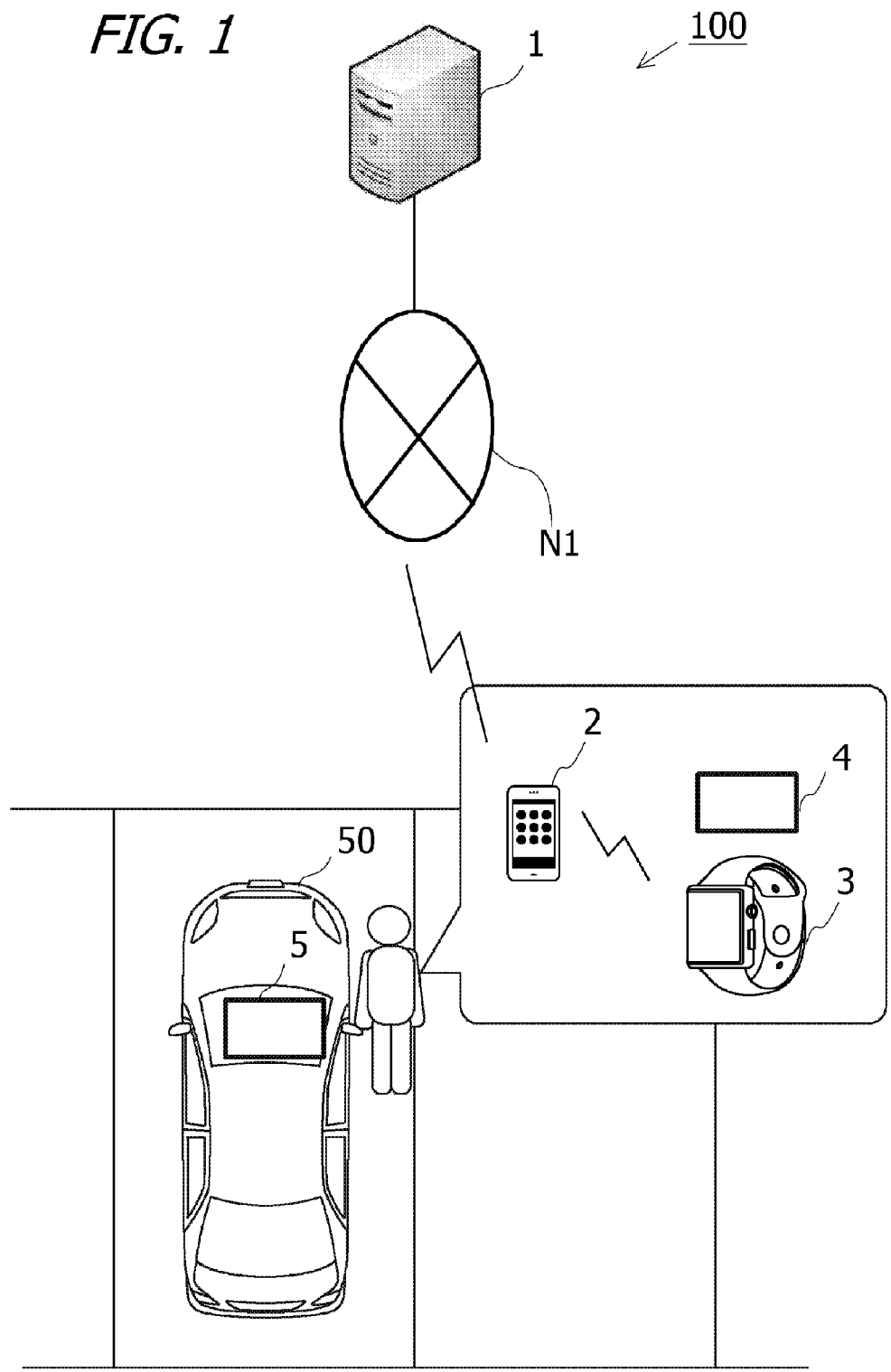
FIG. 1 is a diagram illustrating an exemplary system configuration of a parking management system according to the first embodiment.

An aspect of the present disclosure is an information processing apparatus including a processor configured to: acquire position information acquired by a terminal worn by a user on a vehicle or by a terminal on the vehicle as position information of the vehicle, and identify a first parking slot in which the vehicle is parked based on a plurality of pieces of position information of a parking slot for each of a plurality of parking slots included in a parking lot and the position information of the vehicle.

The information processing apparatus is, for example, a server. The processor is, for example, one or more processors such as CPUs (Control Processing Units). The terminal worn by the user is, for example, a wearable terminal. For example, a data communication device and a vehicle control device are used as the terminal on the vehicle when the vehicle is in an autonomous travel mode. The user on the vehicle includes, for example, a user riding in the vehicle and a user located in a periphery of the vehicle such as a user who will get on the vehicle from now on, a user who is riding on the vehicle, and a user who was riding on the vehicle. The periphery of the vehicle refers to, for example, no more than 1 meter from the vehicle.

According to one aspect of the present disclosure, the first parking slot where the vehicle is parked may be identified from position information of the vehicle and position information of the respective parking slot.

In one of the disclosed aspects, the information processing apparatus may further include a storage storing the position information of the plurality of parking slots. That is, the position information of each parking slot may be acquired in advance. As a result, it is possible to reduce the time required for acquisition processing of the position information of the parking slot and a processing load.

Also, in one of the disclosed aspects, the position information of the plurality of parking slots may be position information of predetermined positions within a respective parking slot. The parking slot has an area that is at least greater than the vehicle. Therefore, by setting coordinates of one point of a predetermined position in the parking slot to be the position information of the parking slot, it is possible to reduce the burden in the process of identifying the first parking slot.

In this case, the predetermined position in each parking slot may be a position shifted a predetermined distance from a center of the parking slot to a driver's side of a vehicle to be parked in the parking slot. In addition, the predetermined distance may be based on a position of a driver's seat and/or a size of the vehicle to be parked in the parking slot. The position information of the parking slot is therefore position information of a position closer to the terminal worn by the user or a position closer to the terminal on the vehicle. The terminal worn by the user or the terminal on the vehicle is a device that acquires the position information of vehicle. Therefore, the first parking slot in which the vehicle parks can be identified more accurately.

In one aspect of the present disclosure, the processor may identify, as the first parking slot, a parking slot with the smallest distance between the position indicated by the position information of the vehicle and the position indicated by the position information of the parking slot. A distance between the vehicle and the parking slot where the vehicle is parked tends to be closer than a distance between a surrounding parking slot and the vehicle. Therefore, the parking slot where the position indicated by the position information of the vehicle and the position indicated by the position information of the parking slot is the smallest can be identified as the first parking slot.

In an aspect of the present disclosure, the processor may perform acquisition of the position information of the vehicle more than once. The processor may identify, as the first parking slot, a parking slot having the largest number of times that the distance between the position indicated by the position information of the vehicle and the position indicated by the position information of the parking slot is the smallest for each of a plurality of pieces of position information of the vehicle. For example, if the position information is acquired by the terminal worn by the user, the position information changes depending on user movement or action. In addition, even when the position information is acquired by the terminal on the vehicle, an error of the position information may occur. Therefore, the first parking slot where the vehicle is parked is identified more accurately by acquiring the position information of the vehicle several times and identifying, as the first parking slot, a parking slot with the largest number of times that the distance is the smallest.

In an aspect of the present disclosure, the processor may further transmit information regarding the first parking slot and at least one of second parking slots neighboring the first parking slot to a terminal used by the user. For example, by the user selecting the parking slot where the vehicle is parked from the parking slots indicated by the received information, the parking slot where the vehicle is parked can be identified more accurately.

In an aspect of the present disclosure, the position information of the vehicle acquired by the terminal on the vehicle may be position information acquired when it is detected that the vehicle has been parked. Parking the vehicle may be detected, for example, by detecting the stopping of an engine or a motor, an opening and closing of doors, etc. This allows the position information of the vehicle to be automatically acquired without intervention of a human.

In an aspect of the present disclosure, the position information of the vehicle may be position information acquired by the terminal worn by the user or the terminal on the vehicle using a first signal from a first satellite and a second signal from a second satellite. For example, the first satellite and the second satellite are any two of positioning satellites of a GNSS (global navigation satellite system). The Satellite Positioning Systems includes, for example, GPS (global positioning system) in the U.S., the quasi-zenith satellite system in Japan, BeiDou in China, GLONASS in Russia, and Galileo in the European Union. The first signal and the second signal are, for example, signals with time information from the respective positioning satellites. More accurate position information can be acquired by using signals from a plurality of satellites, and a parking slot in which vehicle is parked can be identified more accurately.

In an aspect of the present disclosure, the plurality of pieces of the position information of each of the parking slots may be position information acquired using the first signal from the first satellite and a third signal from the second satellite that is more accurate than the second signal. For example, the second signal is a submeter-class signal and the third signal is a centimeter-class signal. This makes it possible to acquire the position information of the parking slot more accurately.

The higher the accuracy of a terminal receiving a signal from a satellite, the more expensive the terminal is. Position information of a parking slot can be registered in advance. The frequency of updating the position information of the parking slot is often lower than the frequency of acquiring the parking slot of the vehicle. Therefore, in registering the position information of the parking slot, the number of terminals receiving signals from satellites may be less than the number of the terminals acquiring the position information of the vehicle, which include terminals worn by users and terminals on vehicles. Therefore, even when using a receiving terminal that receives the high-precision third signal, it is possible to increase the accuracy of the position information of the parking slot while reducing the cost.

Another aspect of the present disclosure can be regarded as an information processing system including a terminal configured to acquire position information of a vehicle, wherein the terminal is a terminal worn by a user riding on the vehicle or a terminal on the vehicle, and the above-described information processing apparatus. As another aspect of the present disclosure, the present disclosure can be regarded as an information processing method in which an information processing apparatus executes the above-described processing. In addition, as another embodiment of the present disclosure, the present disclosure can be regarded as a program for causing a computer to execute the processing of the above-mentioned information processing apparatus, and a non-transitory computer-readable recording medium for recording the program.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an exemplary system configuration of a parking management system 100 according to the first embodiment. The parking management system 100 is, for example, a system controlled by a manufacturer of vehicles that manages a parking location of stock vehicles in a parking lot of a vehicle dealer. The parking management system 100 includes a center server 1, a user terminal 2, a GNSS terminal 3, and an RFID reader 4. The user terminal 2, the GNSS terminal 3, and the RFID reader 4 are devices carried by a user who operates a vehicle 50 to park at a predetermined parking position. The GNSS terminal 3 is, for example, a watch-type wearable terminal, and is worn by the user who drives and parks the vehicle 50. For example, an RFID tag 5 is provided near a windshield of the vehicle 50. The parking management system 100 may include a plurality of the user terminal 2, the GNSS terminal 3, the RFID reader 4, and the RFID tag 5.

The center server 1 and the user terminal 2 are each connected to a network N1 and can communicate through the network N1. The network N1 is, for example, the Internet. The user terminal 2 and the GNSS terminal 3, and, the user terminal 2 and the RFID reader 4, can communicate with each other by a short-range wireless communication such as BLUETOOTH.

Hundreds to thousands of vehicles are managed by an inventory vehicle control of a vehicle dealer. As a method for managing the parking positions of such a large number of inventory vehicles, for example, there is a method in which a RFID tag is installed on a road surface of each parking slot, and after parking the vehicle, the user reads the RFID tag attached to the vehicle and the RFID tag on the road surface of the parking slot by the RFID reader, and transmits information read by the RFID reader to the center server. However, the installation of RFID tags on the road surface of every parking slot is problematic. For example, it is difficult to install RFID tags on gravel or damage to RFID tags during snowplow operations in snowy areas is likely. In addition, there are problems in reading performance, such as deterioration of performance by flooding of RFID tags installed on the road surface due to rain or the like, and deterioration of reading distances. It also tends to be costly to install RFID tags on the road surface of all parking slots.

In the first embodiment, the parking position of the vehicle is automatically acquired by using the GNSS terminal 3, which is a high-precision GNSS receiving terminal, without installing RFID tags on the road surfaces of each parking slot or the like. Specifically, a user driving a vehicle and parking it at a predetermined parking slot is wearing the GNSS terminal 3, which is a wearable terminal, and acquires a current position by the GNSS terminal 3. In the first embodiment, the GNSS terminal 3 receives a signal from the GPS satellite and a signal from the quasi-zenith satellite system "Michibiki" and acquires position information with higher accuracy. On the other hand, the RFID reader 4 reads vehicle information from the RFID tag 5 attached to the vehicle 50 by operation of the user. The GNSS terminal 3 and the RFID reader 4 respectively transmit the position information and the vehicle information to the user terminal 2 using the short-range wireless communication. The user terminal 2 transmits the position information and the vehicle information to the center server 1. The center server 1 identifies the parking slot from the position information received from user terminal 2, associates the identified parking slot with the vehicle information, and manages the parking position of the vehicle 50. In the first embodiment, the parking position of the vehicle is indicated by the parking slot in which the vehicle is parked.

According to the first embodiment, by using the GNSS terminal 3, it is possible to identify the parking slot of the vehicle 50 with high accuracy. Since a number of the GNSS terminals 3 may correspond to a number of workers and the number of the workers is smaller than that of the parking slots, introduction costs can be kept lower. In addition, the GNSS terminal 3 can use signals from two positioning satellites to acquire the position information with higher accuracy, so that the parking position of the vehicle 50 can be identified with greater accuracy.

Figure 2:
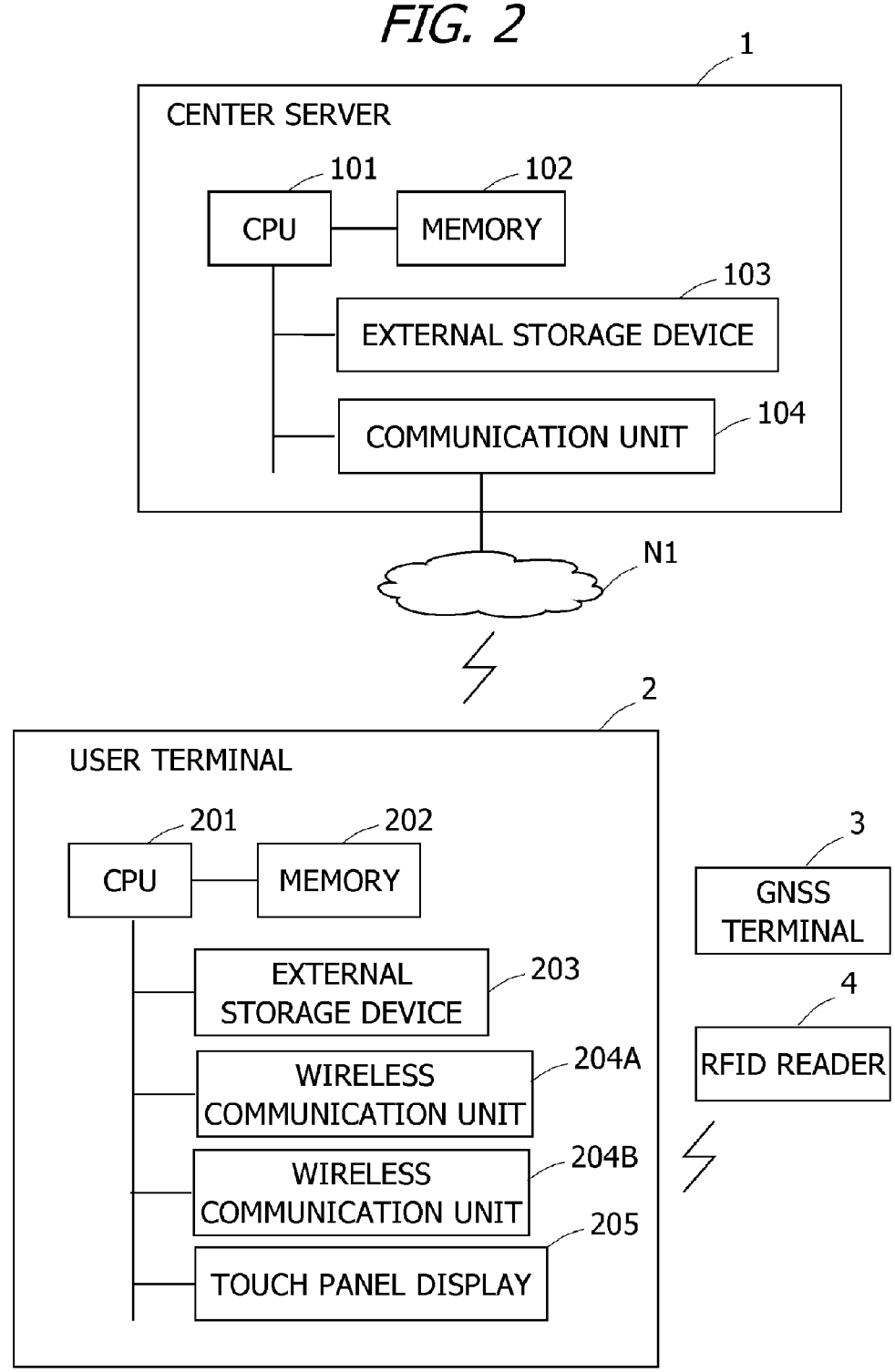
FIG. 2 is an exemplary hardware configuration of a center server and a user terminal.

FIG. 2 is an exemplary hardware configuration of the center server 1 and the user terminal 2. The center server 1 includes a CPU 101, a memory 102, an external storage device 103, and a communication unit 104 as the hardware configuration. The memory 102 and the external storage device 103 are computer readable recording media. The center server 1 is an example of the information processing apparatus.

The external storage device 103 stores various programs and data used by the CPU 101 to execute the programs. The external storage device 103 is, for example, a EPROM (Erasable Programmable ROM) or a HDD (Hard Disk Drive). The programs held in the external storage device 103 may include, for example, an operating system (OS), a control program for the parking management system 100, and various other application programs.

The memory 102 is a storage device that provides the CPU 101 with storage and workspaces for loading the programs stored in the external storage device 103 and for use as a buffer. The memory 102 includes, for example, a solid-state memory such as a ROM (Read Only Memory) or a RAM (Random Access Memory).

The CPU 101 performs various operations by loading the operating system and the various application programs stored in the external storage device 103 into the memory 102 and executing them. A number of the CPU 101 is not limited to one and may be plural. The CPU 101 is an example of the processor.

The communication unit 104 is, for example, a wired network interface such as a LAN (Local Area Network) interface or a dedicated line interface, and is connected to the network N1 through an access network such as the LAN. The hardware configuration of the center server 1 is not limited to the hardware configuration illustrated in FIG. 2.

The user terminal 2 includes, as a hardware configuration, for example, a CPU 201, a memory 202, an external storage device 203, a wireless communication unit 204A, a wireless communication unit 204B, and a touch panel display 205. Note, in FIG. 2, the hardware components related to the parking management system 100 are extracted and illustrated, and the hardware configuration of the user terminal 2 is not limited to that illustrated in FIG. 2.

The CPU 201, the memory 202, and the external storage device 203 are similar to the CPU 101, the memory 102, and the external storage device 103, respectively, and the explanations of them are omitted. The external storage device 203 holds a client application program for the parking management system 100.

The wireless communication unit 204A is, for example, a wireless communication circuit corresponding to a mobile communication system such as 5G (5th Generation), LTE (Long Term Evolution), LTE-Advanced, and 3G, or a wireless communication system such as WiFi. The wireless communication unit 204A connects to the access network by wireless communication and to the network N1 through the access network. In the first embodiment, the wireless communication unit 204A is used for communication with the center server 1.

The wireless communication unit 204B is, for example, a wireless communication circuit corresponding to a predetermined short-range wireless communication method such as BLUETOOTH, BLE (Bluetooth Low Energy), and WiFi. In the first embodiment, the wireless communication unit 204B performs direct communication with the GNSS terminal 3 and the RFID reader 4 by the predetermined short-range wireless communication method. Direct communication is communication without passing through a repeater such as an access point.

The touch panel display 205 is an example of an input device and an output device. For example, a user operation is input to the touch panel display 205, and content of the user operation is output to the CPU 201. The touch panel display 205 displays image data according to an instruction from the CPU 201.

The GNSS terminal 3 has a position information acquiring function and a communication function. The communication function of the GNSS terminal 3 corresponds to, for example, BLUETOOTH (registered trademark), BLE, or WiFi or the like. The position information acquiring function of the GNSS terminal 3 is, in the first embodiment, a function of receiving the signal from the GPS satellite and the signal from the MICHIBIKI, and of acquiring position information using these two signals. The signal from the GPS satellite includes time information. The signal from the MICHIBIKI includes, for example, reinforcement information that includes errors such as delays due to the ionosphere or the like. For example, an LIS signal and an L6 signal are provided for each level of accuracy of position information. The LIS signal is a signal of a sub-meter class positioning reinforcement service. By using the LIS signal, positioning accuracy of 1 meter or less can be obtained. The L6 signal is a signal of a centimeter-class positioning reinforcement service. By using the L6 signal, positioning accuracy in centimeters can be obtained.

The GPS satellite is an example of a first satellite. The MICHIBIKI is an example of a second satellite. The GPS signal is an example of a first signal. The LIS signal is an example of a second signal. The L6 signal is an example of a third signal. The signals used by the GNSS terminal 3 are not limited to the signals from the GPS satellite and the MICHIBIKI. Signals from other positioning satellites may be used.

The RFID reader 4 has a reading function of reading from the RFID tag 5 and a communication function. The communication function of the RFID reader 4 corresponds to, for example, BLUETOOTH®, BLE, WiFi, or the like. The reading function of reading from the RFID tag 5 of the RFID reader 4 is a function of reading vehicle information of the vehicle 50 to which the RFID tag 5 is attached by transmitting a radio wave of a predetermined frequency and acquiring information included in the reflected wave from the RFID tag 5 that operates using the radio wave as an energy source.

Figure 3:
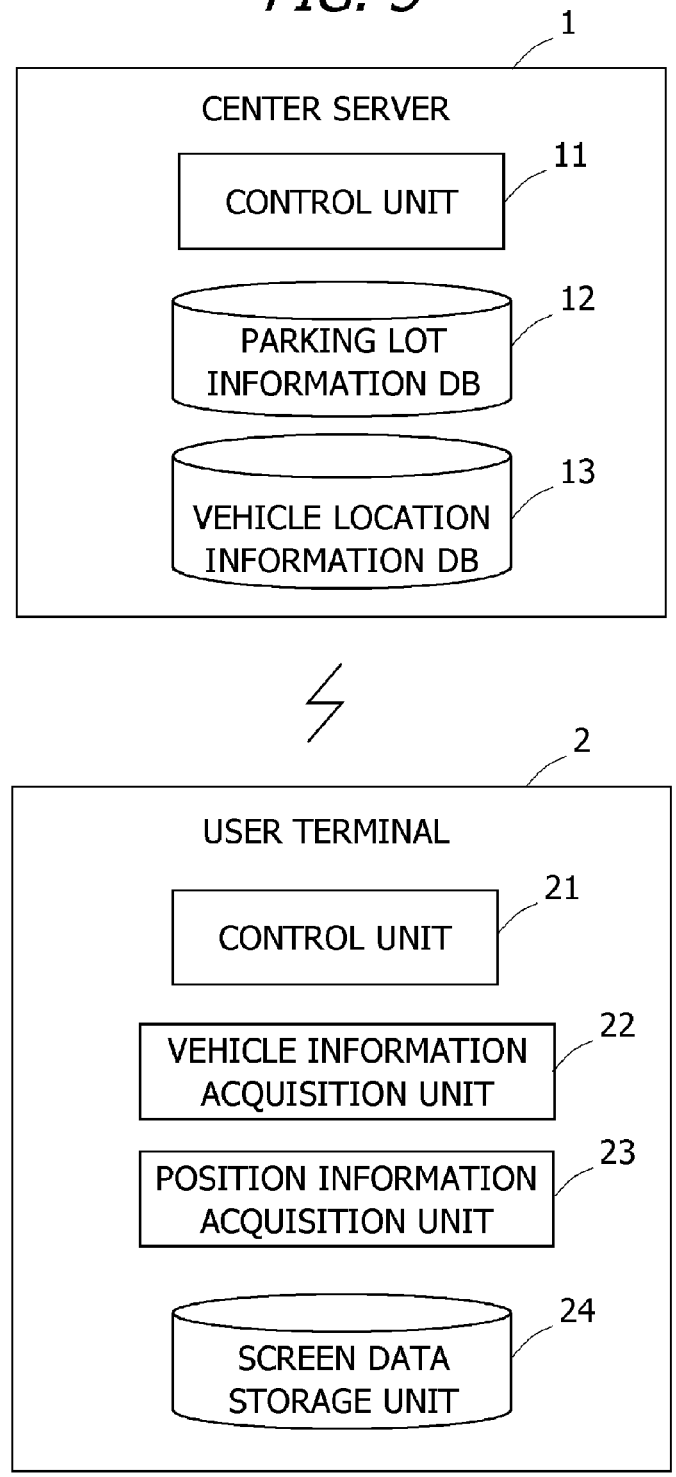
FIG. 3 is a diagram illustrating an exemplary functional configuration of a center server and a user terminal.

FIG. 3 is a diagram illustrating an exemplary functional configuration of the center server 1 and the user terminal 2. The user terminal 2 includes, as a functional configuration, a control unit 21, a vehicle information acquisition unit 22, a position information acquisition unit 23, and a screen data storage unit 24. These functional components are accomplished, for example, by the CPU 201 of the user terminal 2 executing the client application program in the parking management system 100.

The control unit 21 performs display control of the touch panel display 205 and communication control with the center server 1. For example, the control unit 21 displays a vehicle location registration screen in response to a user operation input to the user terminal 2. The vehicle location registration screen is a screen for registering the parking slot of the vehicle 50.

For example, the control unit 21 receives vehicle information of the vehicle 50 from the vehicle information acquisition unit 22. The vehicle information of the vehicle 50 includes, for example, identification information of the vehicle, a vehicle name, a model, a vehicle body color, and the like. The control unit 21 displays the vehicle information of the vehicle 50 on the vehicle location registration screen of the touch panel display 205 when it receives the vehicle information of the vehicle 50.

For example, the control unit 21 receives an operational input of a parking slot acquisition request from the vehicle location registration screen. Upon receipt of the operational input of the parking slot acquisition request, the control unit 21 outputs an instruction to acquire position information to position information acquisition unit 23, and receives the position information from the position information acquisition unit 23. The position information is, for example, latitude and longitude. However, the position information acquired by the position information acquisition unit 23 is not limited to the latitude and the longitude, and may be an address or the like.

When the position information is acquired from the position information acquisition unit 23, the control unit 21 transmits a request for acquiring a parking slot to the center server 1. The request for acquiring the parking slot is a message requesting identification of the parking slot in which the vehicle 50 is parked. Along with the request for acquiring the parking slot, the acquired position information is also sent to the center server 1. That is, the position information of the GNSS terminal 3 acquired from the position information acquisition unit 23 is used as the position information of the vehicle 50.

The control unit 21 receives the identification information of the parking slot and candidate slots of the vehicle 50 from the center server 1 as a reply to the request for acquiring the parking slot. The control unit 21 displays the identification information of the parking slot and the candidate slots of the vehicle 50 received from the center server 1 in the vehicle location registration screen. Upon receiving a request for registering a parking slot input to the vehicle location registration screen, the control unit 21 transmits the request for registering the parking slot to the center server 1. Identification information of a selected parking slot and the vehicle information of the vehicle 50 are also transmitted to the center server 1 together with the request for registering the parking slot. When the request for registering the parking slot is received, the center server 1 registers the parking position of the vehicle 50.

The vehicle information acquisition unit 22 receives, through the wireless communication unit 204B, the vehicle information of the vehicle 50 from the RFID reader 4. For example, when the user who has driven and parked the vehicle 50 operates the RFID reader 4 to read the RFID tag 5, the RFID reader 4 acquires the vehicle information of the vehicle 50 and transmits it to the user terminal 2. The vehicle information acquisition unit 22 outputs the vehicle information of the vehicle 50 to the control unit 21.

Upon receiving an instruction to acquire position information from the control unit 21, the position information acquisition unit 23 transmits a request for acquiring position information to the GNSS terminal 3 through the wireless communication unit 204B. The position information acquisition unit 23 receives the position information as a reply to the request for acquiring the position information from the GNSS terminal 3 through the wireless communication unit 204B. The position information acquisition unit 23 outputs the received position information to the control unit 21.

The screen data storage unit 24 is created in a storage area of the external storage device 203. The screen data storage unit 24 holds screen data of the vehicle location registration screen. Details of the process of the control unit 21 and details of the vehicle location registration screen will be described later.

Next, the center server 1 includes, as functional components, a control unit 11, a parking lot information database (DB) 12, and a vehicle location information DB 13. These functional configurations are accomplished, for example, by the CPU 101 of the center server 1 executing a control program of the parking management system 100 that is stored in the external storage device 103.

The control unit 11 manages the parking position of the vehicle 50. Specifically, the control unit 11 receives the request for acquiring the parking slot from the user terminal 2. Along with the request for acquiring the parking slot, the position information of the vehicle 50 is also received. The control unit 11 refers to the parking lot information DB 12, which will be described later, using the received position information of the vehicle 50, and identifies the parking slot of vehicle 50.

A representative coordinate is set in advance for each parking slot. The control unit 11 identifies, as the parking slot of the vehicle 50, a parking slot of which a distance between the position information of the vehicle 50 and a representative coordinate is the smallest. It should be noted that the methods for identifying the parking slot of the vehicle 50 are not limited thereto. For example, information indicating a range of each parking slot may be held, and a parking slot containing the position information of the vehicle 50 may be specified as the parking slot of the vehicle 50.

In the first embodiment, the control unit 11 acquires, as candidate slots, a plurality of parking slot neighboring the parking slot specified as the parking slot of the vehicle 50. The control unit 11 sends identification information of the parking slot and the candidate slots of the vehicle 50 to the user terminal 2 in response to the request for acquiring the parking slot received from the user terminal 2.

The control unit 11 receives the request for registering the parking slot from the user terminal 2. Along with the request for registering the parking slot, identification information of a parking slot selected by the user and the vehicle information of the vehicle 50 are also received. Upon receiving the request for registering the parking slot from the user terminal 2, the control unit 11 registers the vehicle information of the vehicle 50 and the identification information of the parking slot in association with each other in the vehicle location information DB 13, which will be described later.

The parking lot information DB 12 and the vehicle location information DB 13 are created in a storage area of the external storage device 103. The parking lot information DB 12 holds information for each parking slot in the parking lot managed by the center server 1. The vehicle location information DB 13 holds information indicating the parking position of the vehicle 50. The parking lot information DB 12 and the vehicle location information DB 13 will be described in detail later. The functional configurations of the center server 1 and the user terminal 2 are not limited to the examples illustrated in FIG. 3.

FIG. 4 illustrates exemplary information held in the parking lot information database 12. The parking lot information database 12 holds a representative coordinate of each parking slot. One record of the parking lot information database 12 includes, for example, fields of a site ID, a parking slot ID, and a representative coordinate. Identification information of the parking lot is stored in the field of the site ID. Identification information of a parking slot in the parking lot is stored in the field of the parking slot ID. That is, in the first embodiment, the identification information of the parking slot is a combination of the values in the fields of the site ID and the parking slot ID. However, a parking slot may be identified by assigning a unique identification number thereto.

A representative coordinate of a parking slot is stored in the field of representative coordinate. The representative coordinate of the parking slot is a coordinate measured in advance by an administrator of the parking management system 100. For registering the representative coordinate, for example, the user terminal 2 and a high-precision GNSS terminal are used. The high-precision GNSS terminal used to register the representative coordinate is more accurate than the GNSS terminal 3 used to identify the parking slot in which the vehicle 50 is parked. For example, the GNSS terminal 3 used to identify the vehicle 50 is a terminal that provides a sub-meter-class positioning accuracy based on receiving L1S signals. For example, the high-precision GNSS terminal used to register the representative coordinate of parking slot is a terminal that provides a centimeter-class positioning accuracy based on receiving L6 signals.

The accuracy of identifying the parking slot in which the vehicle 50 is parked may be reduced if the accuracy of the representative coordinate of the parking slot is low. Therefore, the representative coordinate of the parking slot requires a higher accuracy than the position information of the vehicle 50. Registration of the parking slot of the vehicle 50 may be operated by a plurality of users in parallel, and real-time performance is requested. Therefore, to register the parking slot of the vehicle 50, a plurality of GNSS terminals 3 is needed. On the other hand, the representative coordinate of the parking slot is updated when an arrangement change of the parking slot occurs in the parking lot after it is registered once, and an update frequency is low. Thus, the number of GNSS terminals needed to register a parking slot's representative coordinate is less than the number of GNSS terminals 3 used to register a parking slot of the vehicle 50. The higher the accuracy of the GNSS terminal is, the more expensive the GNSS terminal is. However, the number of the GNSS terminals used to register the representative coordinate of the parking slot may be small. Therefore, even if a more expensive GNSS terminal is used for registering the representative coordinate of the parking slot, an increase in costs can be suppressed.

The control unit 21 of the user terminal 2 sends a request for registering a representative coordinate to the center server 1 in response to a user operation. Along with the request for registering the representative coordinate, the identification information of the parking slot and the position information received from the high-precision GNSS terminal are also sent to the center server 1. The identification information of the parking slot to be transmitted to the center server 1 at this time is, for example, one entered by a user operation. When the control unit 11 of the center server 1 receives the request for registering the representative coordinate from the user terminal 2, the control unit 11 registers the received identification information of the parking slot and the received position information in the parking lot information DB 12 in association with each other.

Figure 5:
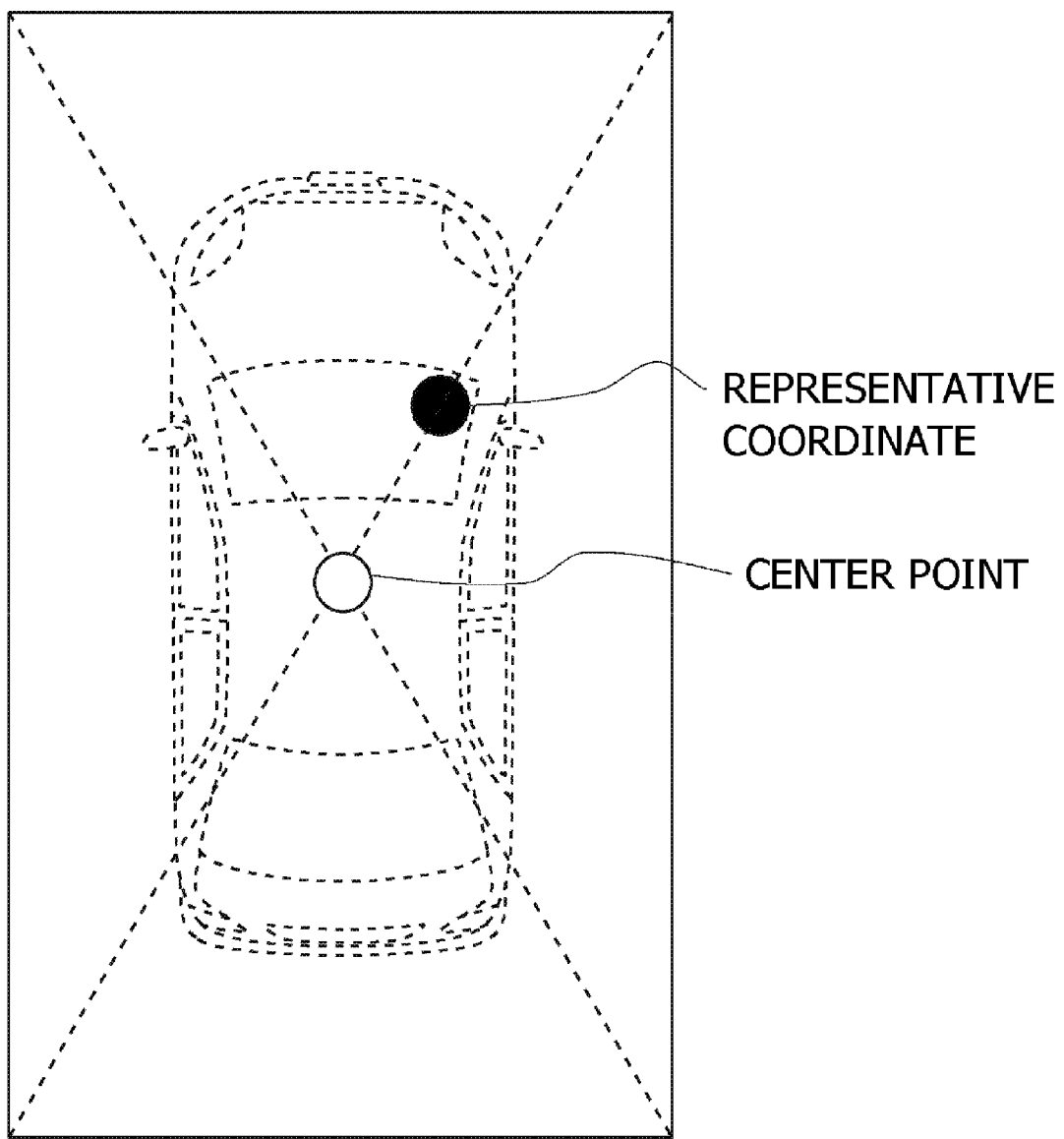
FIG. 5 is a diagram illustrating an exemplary position of a representative coordinate of a parking slot.

FIG. 5 is a diagram illustrating an exemplary position of a representative coordinate of a parking slot. In the first embodiment, the representative coordinate of the parking slot is position information measured at a position close to the driver's seat deviated from a center point of the parking slot. Within the parking slot, the user carries the GNSS terminal and moves to a vicinity of the driver's seat in the vehicle, measures the position information, and registers its position information as the representative coordinate. This is because the position where the representative coordinate of the parking slot is measured is assumed to be the position where the user acquires the position information when the vehicle 50 is actually parked. This makes it possible to bring the position of the representative coordinate closer to the position where the position information is measured on identifying the parking slot of the vehicle 50, and to identify the parking slot of the vehicle 50 more accurately.

Since the representative coordinate is artificially measured, an error occurs in a positional relation between the center point and the representative coordinate, in each parking slot. However, the error is such that it does not affect the identification of the parking slot. In addition, the position of the driver's seat may differ depending on the vehicle. For example, the driver's seat of a Japanese-made vehicle is on the right, while the driver's seat of a European-American-made vehicle is on the left. Therefore, depending on the type of vehicle (the driver's seat is on the right or left), the representative coordinate may be set and held in the parking lot information DB 12, and the representative coordinate to be used may be switched depending on the type of vehicle. Further, since a relative position of the driver's seat in the parking slot may change depending on a size of vehicle, the position of the representative coordinate may be determined based on the size of vehicle. In this instance, a representative coordinate may be set for each parking slot for each of vehicle types (sedans, wagons, etc.).

FIG. 6 illustrates exemplary information held in the vehicle location information DB 13. Information about the parking position of a vehicle is stored in the vehicle location information DB 13. One record of the vehicle location information DB 13 includes, for example, fields of a vehicle ID, a site ID, a parking slot ID, a vehicle name, a model, and a vehicle body color. Identification information of the vehicle is stored in the field of vehicle ID.

In the field of the site ID, identification information of a parking lot in which the vehicle indicated by the value in the field of the vehicle ID in the corresponding record is parked is stored. In the field of the parking slot ID, identification information of the parking slot in the parking lot in which the vehicle of the corresponding record is parked is stored.

In the first embodiment, the parking slot in which the vehicle indicated by the value of the field of the vehicle ID of the record is parked is identified by the value stored in the fields of the site ID and the parking slot ID of the record of the vehicle location information DB 13.

In the field of the vehicle name, a name of the vehicle indicated by the value in the field of the vehicle ID in the corresponding record is stored. In the field of the model, information indicating the model of the vehicle indicated by the value in the field of the vehicle ID in the corresponding record is stored. In the field of the body color, information indicating the body color of the vehicle indicated by the value in the field of the vehicle ID in the corresponding record is stored.

Records in the vehicle location information DB 13 are created when the request for registering the parking slot is received from the user terminal 2. The values of the fields of the vehicle ID, the vehicle name, the model, and the body color are information included in the vehicle information of the vehicle 50 received with the request for registering the parking slot. The values of the fields of the site ID and the parking slot ID are the identification information of the parking slot in which the vehicle 50 is parked received with the request for registering the parking slot. The data structure of the vehicle location information DB 13 is not limited to the data structure illustrated in FIG. 6.

Figure 7:
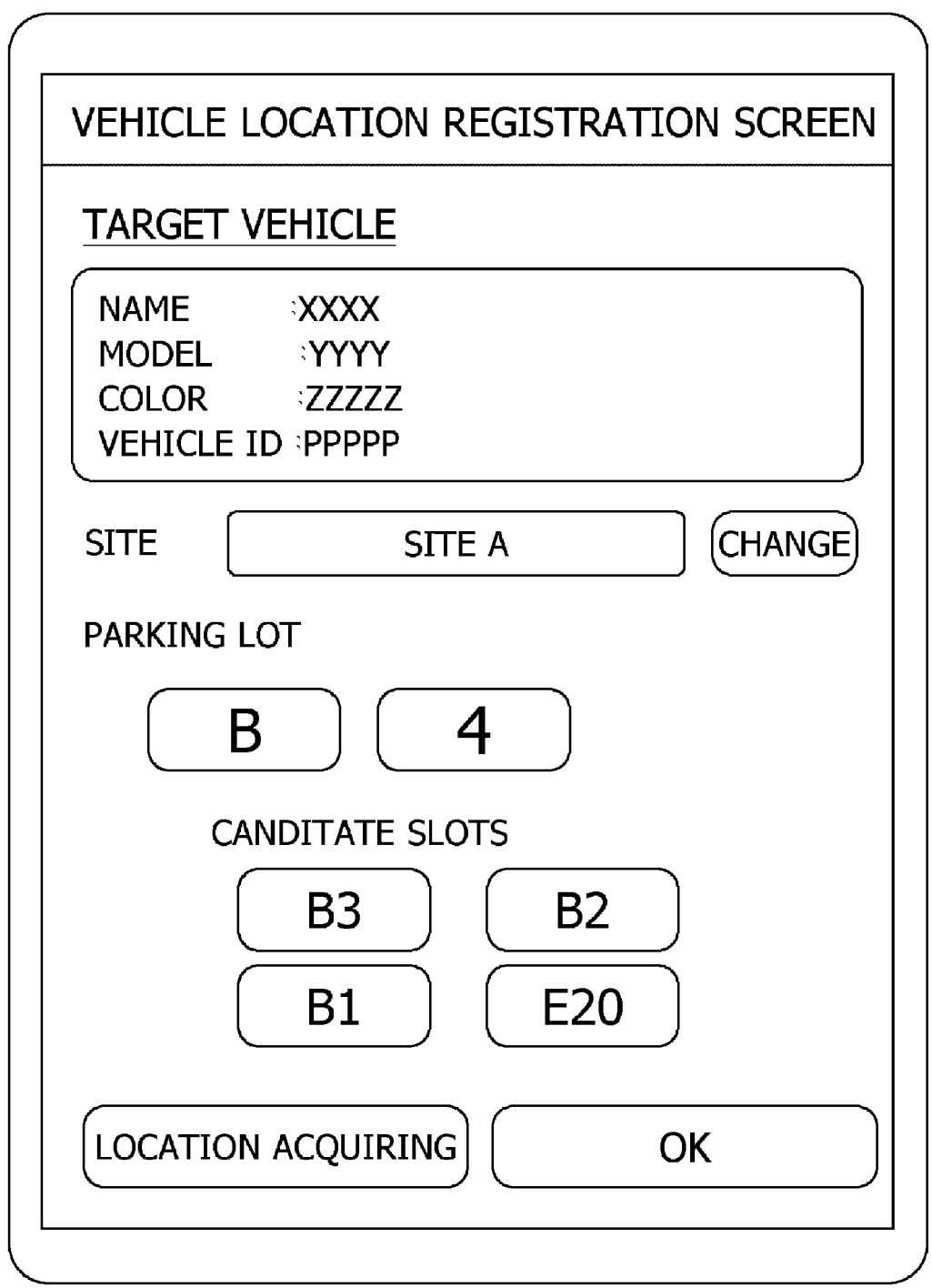
FIG. 7 is an exemplary vehicle location registration screen of a user terminal.

FIG. 7 is an exemplary vehicle location registration screen of the user terminal 2. The vehicle location registration screen is a screen used to register the parking slot of the vehicle 50. The vehicle location registration screen includes, for example, a field for displaying vehicle information of the vehicle 50 as a target vehicle, a field for displaying the site, a field for displaying the parking slot, a field for indicating the candidate slots of the parking slot, a location acquiring button, and an OK button. The field for displaying the vehicle information of the vehicle 50, the field for displaying the site, the field for displaying the parking slot, and the field for indicating the candidate slots of the parking slot are blank in an initial state.

The field for displaying the vehicle information of the vehicle 50 is displayed when the user terminal 2 receives the vehicle information of the vehicle 50 from the RFID reader 4. Selection of the location acquiring button indicates an input to the user terminal 2 of an operation of the request for acquiring the parking slot. The user terminal 2 receives input of the operation of the request for acquiring the parking slot, acquires the position information from the GNSS terminal 3, sends the request for acquiring the parking slot to the center server 1, and receives the identification information of the parking slot and the candidate slots from the center server 1.

In the field for displaying the site, the field for displaying the parking slot, and the field for indicating the candidate slots of the parking slot, each information is displayed when the user terminal 2 receives the identification information of the parking slot and the candidate slots as a response to the request for acquiring the parking slot from the center server 1.

When an operation of selecting the OK button is input, an operation of the request for registering the parking slot is inputted to the user terminal 2. The user terminal 2 sends the request for registering the parking slot along with the identification information of the parking slot displayed in the field for displaying the parking slot and the vehicle information to center server 1 when the operation of the request for registering the parking slot is inputted. If the parking slot displayed in the field for displaying the parking slot differs from the parking slot in which the vehicle 50 is actually parked, the user selects a parking slot in which the vehicle 50 is actually parked among the parking slots displayed in the field for displaying the candidate slots. As a result, the parking slot displayed in the field for displaying the parking slot is updated. Thereafter, when the user selects the OK button, the parking slot displayed in the field for displaying the parking slot, the vehicle information, and the request for registering the parking slot are transmitted.

In a state in which the vehicle information of the vehicle 50 is not acquired, the location acquiring button cannot be selected, and when the vehicle information of the vehicle 50 is acquired, the location acquiring button may be changed to a selectable state. The configuration of vehicle location registration screen is not limited to that illustrated in FIG. 7.

<Flow of Process>

Figure 8:
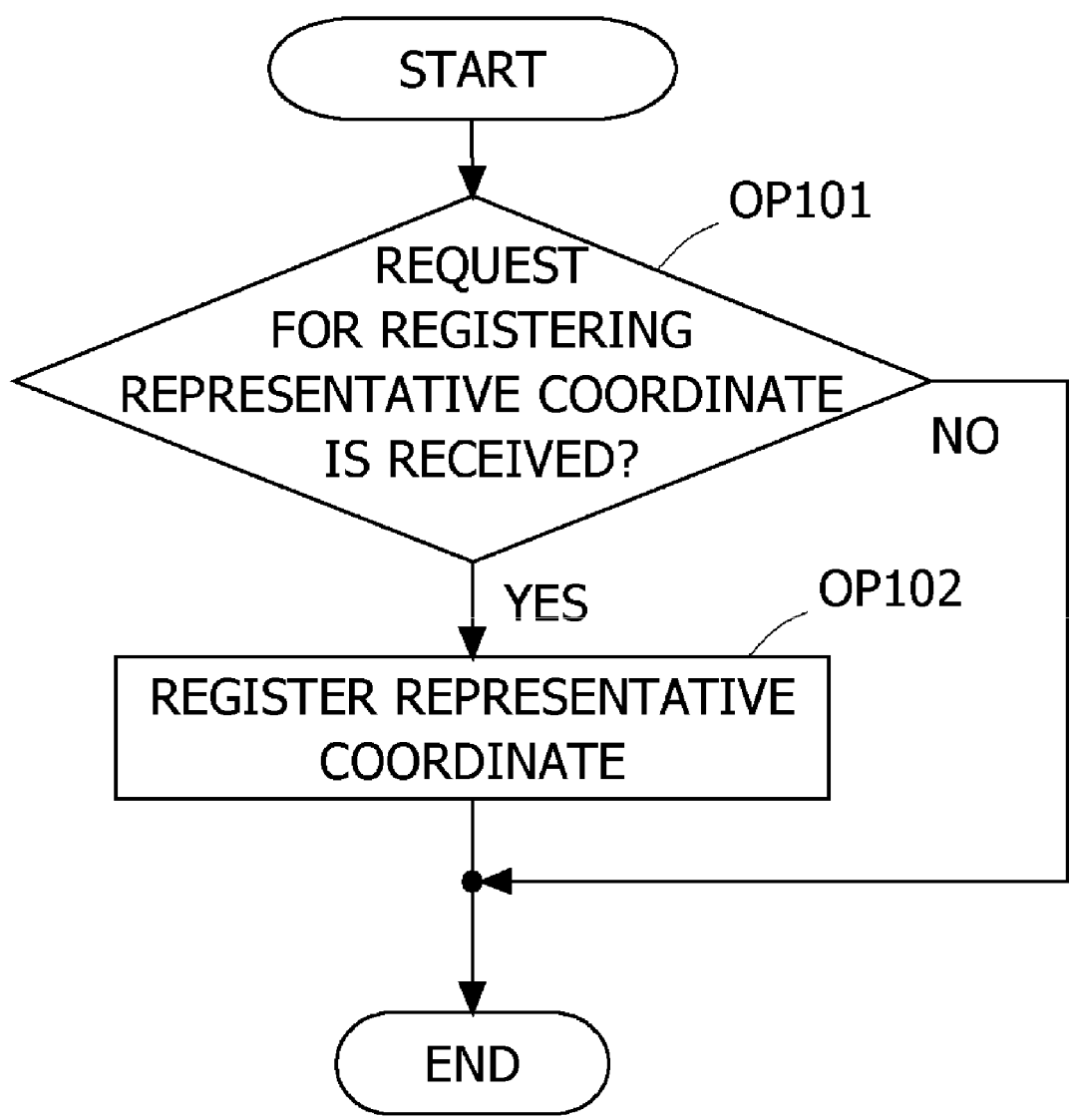
FIG. 8 is an exemplary flow chart of a process of registering a representative coordinate performed by a center server.

FIG. 8 is an exemplary flow chart of the process of registering a representative coordinate performed by the center server 1. The processing illustrated in FIG. 8 is repeatedly executed at a predetermined period. Although the executing entity of the process illustrated in FIG. 8 is the CPU 101 of center server 1, for convenience, the functional components will be described as the executing entity. This also applies to the following description of the flowcharts of the process performed by the center server 1.

In OP101, the control unit 11 determines whether or not it has received a request for registering the representative coordinate from the user terminal 2. If the request for registering a representative coordinate is received from the user terminal 2 (OP101: YES), the process proceeds to OP102. If no request for registering the representative coordinate has been received from the user terminal 2 (OP101: NO), the process illustrated in FIG. 8 is ended.

In OP102, the control unit 11 registers identification information of a parking slot and position information received from the user terminal 2 with the request for registering the representative coordinate in the parking lot information DB 12. Thereafter, the processing illustrated in FIG. 8 ends.

Figure 9:
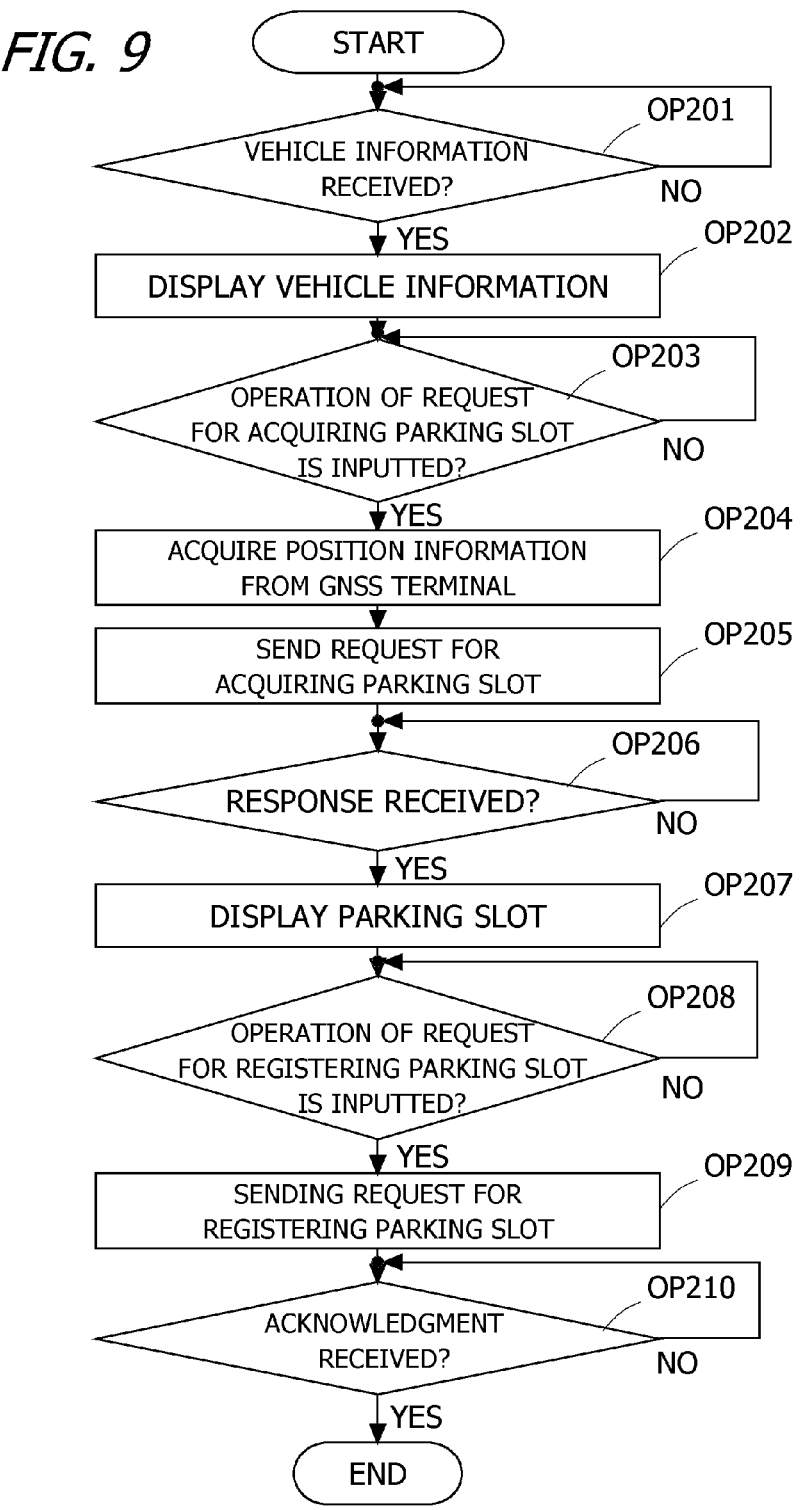
FIG. 9 is an exemplary flow chart of a process of registering a parking slot of a vehicle performed by a user terminal.

FIG. 9 is an exemplary flow chart of the process of registering a parking slot of the vehicle 50 performed by the user terminal 2. The process illustrated in FIG. 9 is initiated when the vehicle location registration screen is activated. Although the executing entity of the process illustrated in FIG. 9 is the CPU 201 of the user terminal 2, for convenience, the functional components will be described as the executing entity.

In OP201, the control unit 21 determines whether or not the vehicle information of the vehicle 50 is received from the RFID reader 4 through the wireless communication unit 204B. When the vehicle information of the vehicle 50 is received from the RFID reader 4 (OP201: YES), the process proceeds to OP202. If the vehicle information of the vehicle 50 has not been received from the RFID reader 4 (OP201: NO), the control unit 21 is in a standby status. For example, if the vehicle information of the vehicle 50 is not received after a predetermined period of time, the process of FIG. 9 may be ended.

In OP202, the control unit 21 causes the vehicle location registration screen to display the received vehicle information of the vehicle 50.

In OP203, the control unit 21 determines whether an operation of a request for acquiring the parking slot has been input. The operation of the request for acquiring the parking slot is input when the location acquiring button in the vehicle location registration screen button is selected. If the operation of the request for acquiring the parking slot is inputted (OP203: YES), the process proceeds to OP204. If the operation of the request for acquiring the parking slot is not inputted (OP203: NO), the control unit 21 is in the standby status. For example, if the operation of the request for acquiring the parking slot is not inputted after a predetermined period has elapsed, the process of FIG. 9 may be ended.

In OP204, the control unit 21 sends a request for acquiring position information to the GNSS terminal 3 through the wireless communication part 204B, and acquires the position information from the GNSS terminal 3. In OP205, the control unit 21 sends a request for acquiring the parking slot to the center server 1 through the wireless communication unit 204A. Along with the request for acquiring the parking slot, the position information acquired in OP204 as position information of the vehicle 50 is also transmitted. Vehicle information of the vehicle 50 may also be transmitted together with the request for acquiring the parking slot.

In OP206, the control unit 21 determines whether or not a reply to the request for acquiring the parking slot has been received from the center server 1 through the wireless communication unit 204A. If the reply to the request for acquiring the parking slot is received from the center server 1 (OP206: YES), the process proceeds to OP207. If no reply to the request for acquiring the parking slot has been received from the center server 1 (OP206: NO), the control unit 21 is in the standby status. For example, if no reply to the request for acquiring the parking slot is received after a predetermined period of time has elapsed, the process of FIG. 9 may be ended. As the reply to the request for acquiring the parking slot, identification information of the parking slot and the candidate slots is received.

In OP207, the control unit 21 displays the identification information of the parking slot and the candidate slots identified by the center server 1 in the vehicle locations registration screen. In OP208, the control unit 21 determines whether an operation of a request for registering the parking slot has been inputted. The operation of the request for registering the parking slot is inputted into the user terminal 2 by selecting the OK button of the vehicle location registration screen. If the operation of the request for registering the parking slot is inputted (OP208: YES), the process proceeds to OP209. If the operation of the request for registering the parking slot is not inputted (OP208: NO), the control unit 21 is in the standby status. For example, if the operation of the request for registering the parking slot is not inputted after a predetermined period has elapsed, the process of FIG. 9 may be ended.

In OP209, the control unit 21 sends the request for registering the parking slot to the center server 1 through the wireless communication unit 204A. Along with the request for registering the parking slot, the identification information of the parking slot displayed in the field for displaying the parking slot of the vehicle location registration screen and the vehicle information of vehicle 50 are also sent.

In OP210, the control unit 21 determines whether or not an acknowledgement to the request for registering the parking slot has been received from the center server 1 through the wireless communication unit 204A. If the acknowledgment to the request for registering the parking slot is received from the center server 1 (OP210: YES), the process illustrated in FIG. 9 is ended. If no acknowledgment to the request for registering the parking slot has been received from the center server 1 (OP210: NO), the control unit 21 is in the standby status. For example, if the acknowledgement to the request for registering the parking slot is not received after a predetermined period of time has elapsed, the process of FIG. 9 may be ended.

Figure 10:
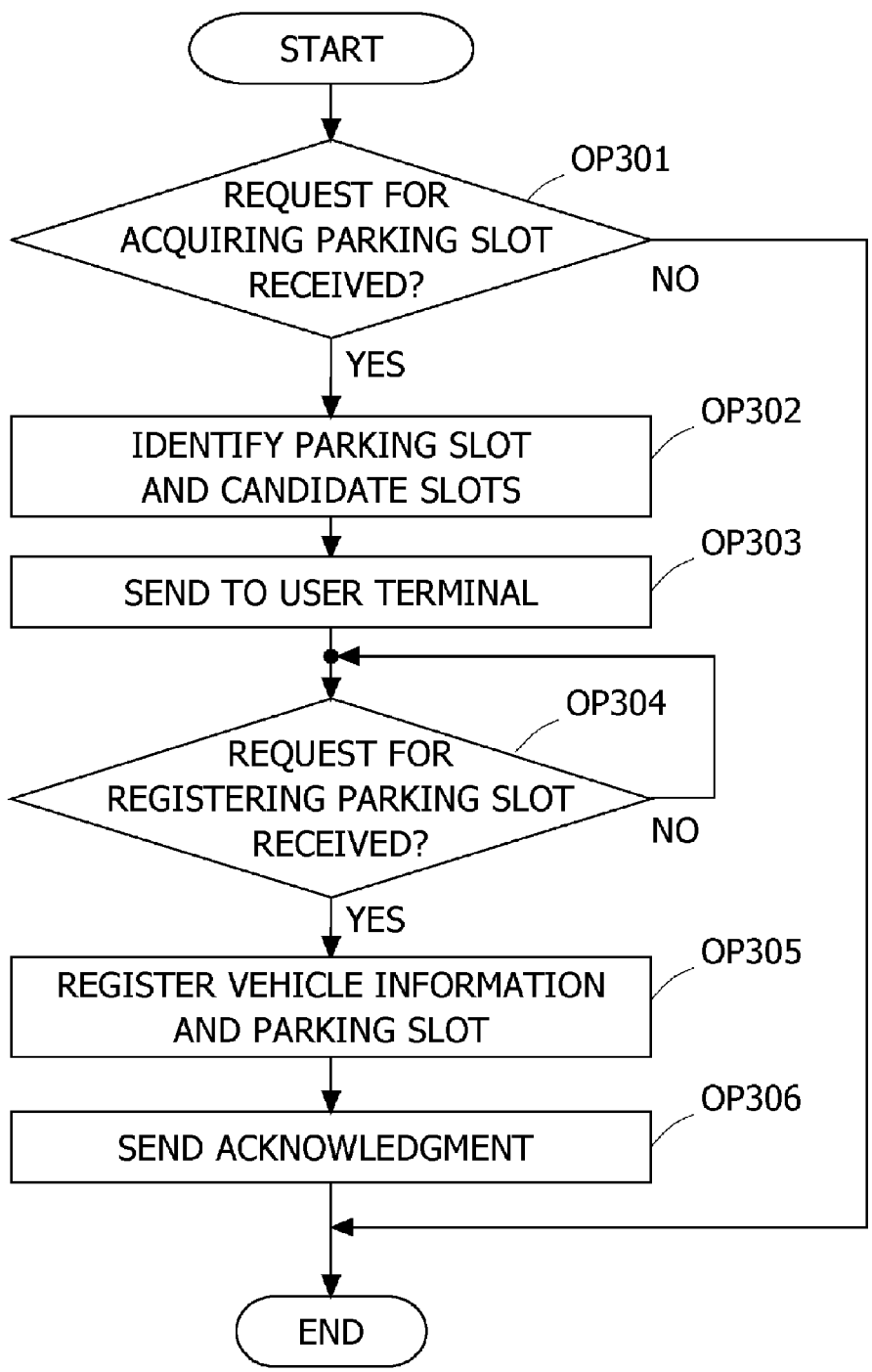
FIG. 10 is an exemplary flowchart of a process of registering a parking position of a vehicle performed by a center server.

FIG. 10 is an exemplary flow chart of the process of registering the parking position of the vehicle performed by the center server 1. The processing illustrated in FIG. 10 is repeatedly executed at a predetermined period.

In OP301, the control unit 11 determines whether a request for acquiring a parking slot has been received from the user terminal 2. If the request for acquiring the parking slot is received from the user terminal 2 (OP301: YES), the process proceeds to OP302. If no request for acquiring the parking slot is received from the user terminal 2 (OP301: NO), the process illustrated in FIG. 10 is ended. Along with the request for acquiring the parking slot, position information of the vehicle 50 is also received.

In OP302, the control unit 11 identifies a parking slot in which the vehicle 50 is parked and candidate slots based on the position information of the vehicle 50 received with the request for acquiring the parking slot. In OP303, the control unit 11 sends to the user terminal 2 identification information of the parking slot and the candidate slots identified in OP302 as a reply to the request for acquiring the parking slot.

In OP304, the control unit 11 determines whether a request for registering a parking slot has been received from the user terminal 2. If the request for registering the parking slot is received from the user terminal 2 (OP304: YES), the process proceeds to OP305. If no request for registering the parking slot has been received from the user terminal 2 (OP304: NO), the control unit 11 is in the standby status. Along with the request for registering the parking slot, the identification information of the parking slot of the vehicle 50 and the vehicle information of the vehicle 50 are also received.

In OP305, the control unit 11 registers the identification information of the vehicle 50 and the vehicle information of the vehicle 50 received with the request for registering the parking slot in association with each other in the vehicle location DB 13. In OP306, the control unit 11 sends an acknowledgement corresponding to the request for registering the parking slot to the user terminal 2. Thereafter, the process illustrated in FIG. 10 is ended.

The processes of the center server 1 and the user terminal 2 illustrated in FIGS. 8 to 10 are merely examples, and the present disclosure is not limited thereto. For example, when a representative coordinate corresponding to the position of the driver's seat of the vehicle is set in the parking lot information DB 12 of the center server 1, the vehicle information of the vehicle 50 is transmitted from the user terminal 2 to the center server 1 together with the request for acquiring the parking slot. In OP302, the control unit 11 may identify each representative coordinate of parking slots corresponding to the position of the driver's seat of the vehicle 50 from the vehicle information of the vehicle 50, and identify a parking slot of the vehicle 50 using the identified representative coordinates.

Figure 11:
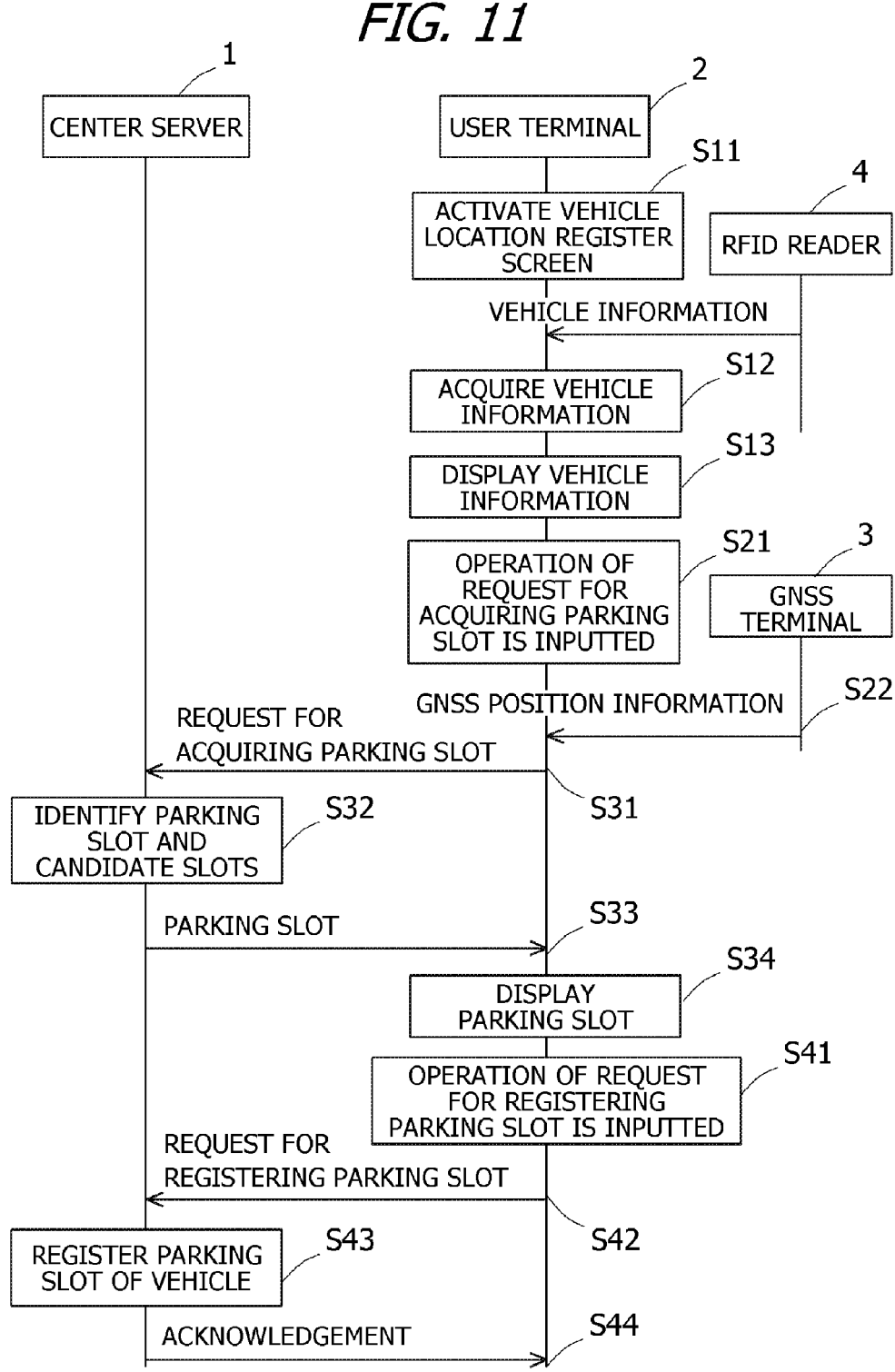
FIG. 11 is an exemplary sequence diagram of a process performed in a parking management system when registering a parking slot of a vehicle.

FIG. 11 is an exemplary sequence diagram of the process performed in the parking management system 100 when registering a parking slot of a vehicle. In S11, the user who drives the vehicle 50 and parks in a predetermined parking slot operates the user terminal 2 and activates the vehicle location registration screen. In S12, the user makes an operation to the RFID reader 4, and reads the vehicle information of the vehicle 50 from the RFID tag 5 attached to the vehicle 50, and the vehicle information of the vehicle 50 is transmitted from the RFID reader 4 to the user terminal 2. The user terminal 2 receives the vehicle information of the vehicle 50 from the RFID reader 4 (FIG. 9, OP201: YES).

In S13, the user terminal 2 displays the vehicle information of the vehicle 50 in the vehicle location registration screen (FIG. 9, OP202).

In S21, the user selects the location acquiring button in the vehicle location registration screen of the user terminal 2, and an operation of the request for acquiring the parking slot is entered into the user terminal 2 (FIG. 9, OP203: YES). In S22, the user terminal 2 sends the GNSS terminal 3 the request for acquiring position information and acquires the position information from the GNSS terminal 3 as a response (FIG. 9, OP204).

In S31, the user terminal 2 transmits the request for acquiring the parking slot and the position information of the vehicle 50 to the center server 1 (FIG. 9, OP205). The position information of the vehicle 50 is the position information received from the GNSS terminal 3 in S22. In S32, the center server 1 receives the request for acquiring the parking slot from user the user terminal 2 (FIG. 10, OP301: YES), and, based on the position information of the vehicle 50 received together with the request for acquiring the parking slot, identifies the parking slot in which the vehicle 50 is parked and the candidate slots (FIG. 10, OP302).

In S33, the center server 1 sends, to the user terminal 2, the identification information of the parking slot and the candidate slots identified in S32 as the reply to the request for acquiring the parking slot (FIG. 10, OP303). In S34, the user terminal 2 receives the identification information of the parking slot and the candidate slots from the center server 1 (FIG. 9, OP206: YES), and displays them on the vehicle location registration screen (FIG. 9, OP207).

In step S41, the user of the user terminal 2 selects the OK button in the vehicle location registration screen, and the request for registering a parking slot is inputted to the user terminal 2 (FIG. 9, OP208: YES). In S42, the user terminal 2 transmits the request for registering the parking slot, the identification information of the parking slot of the vehicle 50, and the vehicle information of the vehicle 50 to the center server 1 (FIG. 9, OP209).

In S43, the center server 1 receives the request for registering the parking slot from the user terminal 2 (FIG. 10, OP304: Yes), and registers the identification information of the parking slot of the vehicle 50 received and the vehicle information of the vehicle 50 together with the request for registering the parking slot in association with each other in the vehicle location information database 13 (FIG. 10, OP305). In S44, the center server 1 sends the acknowledgment to the request for registering the parking slot to the user terminal (FIG. 10, OP306).

Operations and Effects of the First Embodiment

In the first embodiment, the position information of the vehicle 50 is acquired by using the GNSS terminal 3. Therefore, the parking slot in which the vehicle 50 is parked can be identified based on the position information of the vehicle 50. In addition, since the GNSS terminal 3 is a wearable terminal, it is easy to install it at a predetermined position without any trouble, and it is low-cost.

Further, in the first embodiment, since the GNSS terminal 3 acquires the position information by using the signals from the two positioning satellites, for example, it is possible to acquire the position information of the positioning accuracy of the sub-meter class, and it is possible to improve the accuracy of identifying a parking slot.

Further, in the first embodiment, the center server 1 identifies the parking slot in which the vehicle 50 is parked from the position information of the vehicle 50, and further transmits information of a plurality of parking slots neighboring the identified parking slot as candidate slots in addition to information of the identified parking slot to the user terminal 2. As a result, even if the parking slot identified by the center server 1 differs from the parking slot in which the vehicle 50 is actually parked, for example, when an error of the position information of the vehicle 50 is large, it is possible to accurately identify the parking slot in which the vehicle 50 is parked by the user selecting a parking slot in which the vehicle 50 is actually parked from the candidate slots in which vehicle 50 is parked.

In the first embodiment, a representative coordinate is set in each parking slot, and the representative coordinate is used to identify a parking slot in which the vehicle 50 is parked. This allows a parameter for each parking slot to be one representative coordinate. Therefore, the workload on the process for identifying the parking slot in which the vehicle 50 is parked is can be reduced.

Further, in the first embodiment, for positioning of the representative coordinate of a parking slot, a higher precision GNSS terminal is used, for example, position information of the centimeter-class accuracy is acquired. It is possible to acquire the representative coordinate of the parking slot with greater accuracy and to improve the particular accuracy of the parking slot in which the vehicle 50 is parked.

In the first embodiment, the user performs operations such as reading the RFID tag 5 attached to the vehicle 50 by the RFID reader 4 and selecting a parking slot in which the vehicle 50 is parked in the vehicle location registration screen, but the user does not directly input the identification information of the parking slot or the identification information of the vehicle. As a result, it is possible to reduce a human error at the time of input. In addition, the efficiency of the operation can be improved.

Second Embodiment

In the first embodiment, the parking management system 100 is assumed to manage the parking location of a vehicle driven by a person. In the second embodiment, a parking management system 100B manages a parking location of an autonomous vehicle that travels unattended. In the second embodiment, the description that is similar to the description in the first embodiment is omitted.

Figure 12:
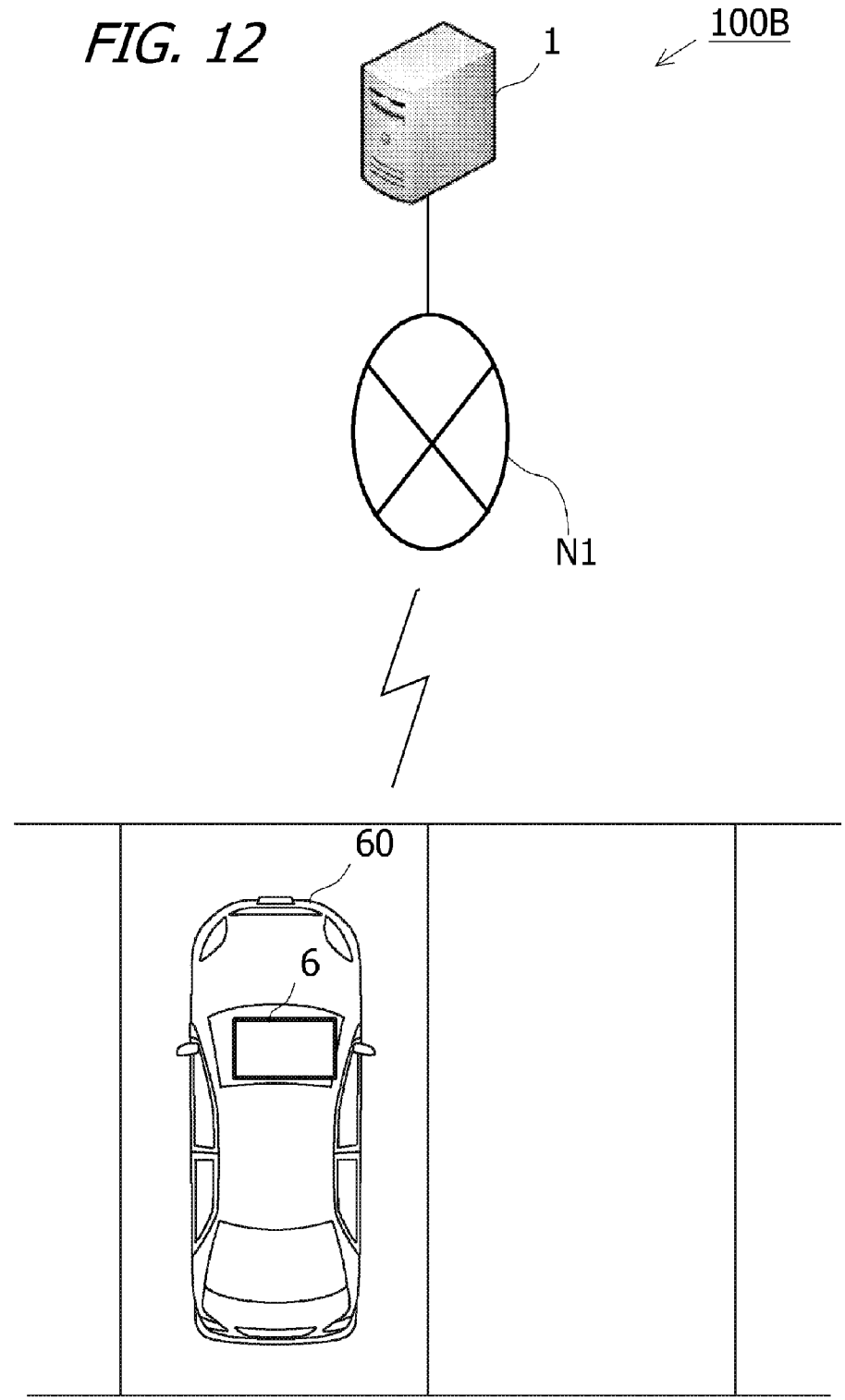
FIG. 12 is a diagram illustrating an exemplary system configuration of a parking management system according to the second embodiment.

FIG. 12 is a diagram illustrating an exemplary system configuration of the parking management system 100B according to the second embodiment. The parking management system includes the center server 1 and an onboard device 6 mounted on a vehicle 60. The vehicle 60 is an autonomous vehicle, moves to a predetermined parking slot in an unattended state, and parks at the predetermined parking slot. The center server 1 and the onboard device 6 can communicate through the network N1.

The onboard device 6 is, for example, a data communication device or a device for controlling the travel of vehicle 60. In the second embodiment, the onboard device 6 has a function of acquiring position information. The onboard device 6 acquires, when parking is detected, position information and transmits the acquired position information together with a request for registering a parking slot and vehicle information of the vehicle 60 to the center server 1. Similar to the GNSS terminal 3, the onboard device 6 utilizes signals from two positioning satellites and acquires position information of the sub-meter class accuracy, for example.

In the second embodiment, when the center server 1 receives the request for registering the parking slot from the onboard device 6, the center server 1 identifies a parking slot in which the vehicle 60 is parked based on the position information received together with the request for registering, associates the identified parking slot with the vehicle 60, and registers it in the vehicle location information DB 13.

Figure 13:
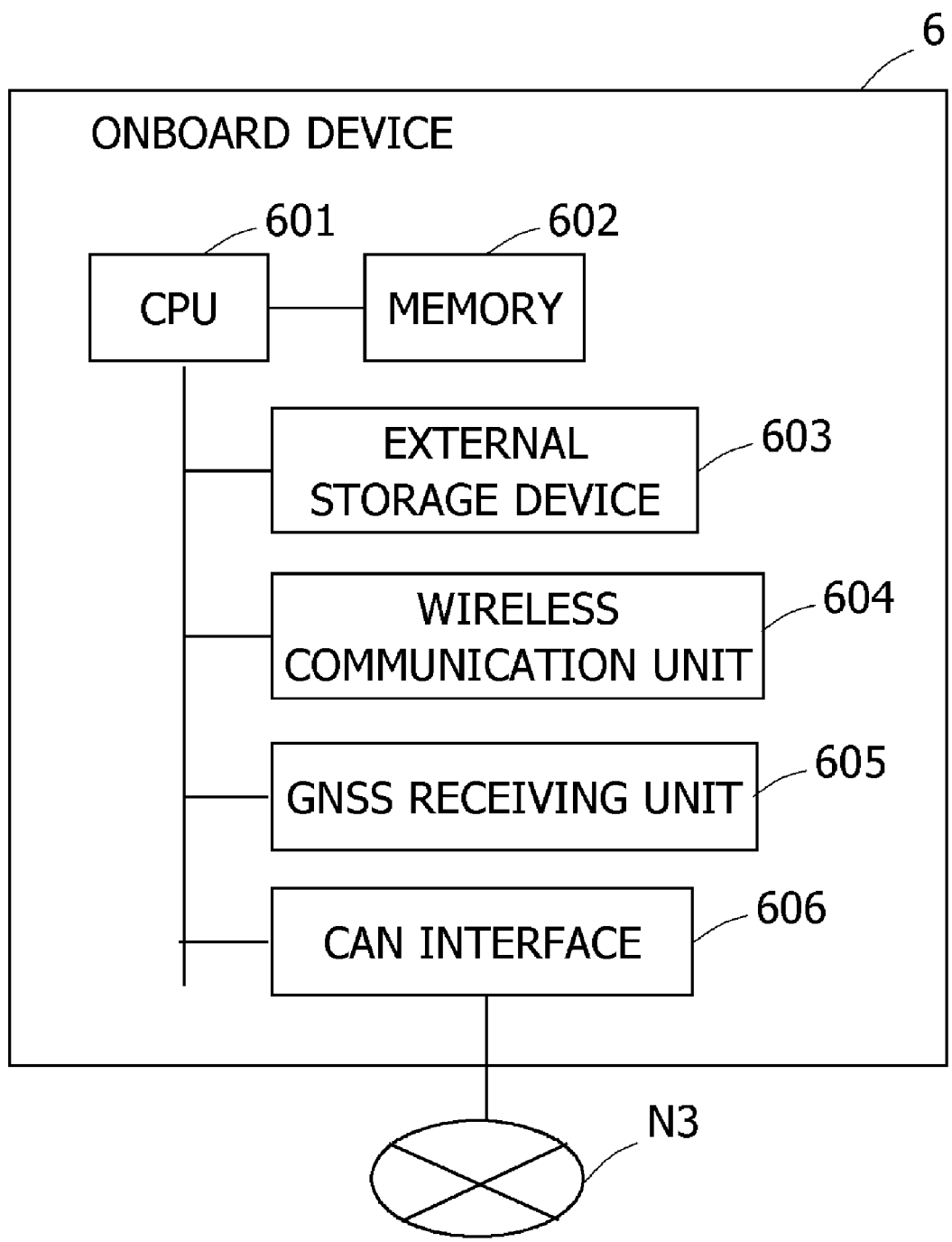
FIG. 13 is a diagram illustrating an exemplary hardware configuration of an onboard device.

FIG. 13 is a diagram illustrating an exemplary hardware configuration of the onboard device 6. The onboard device 6 includes, as the hardware configuration, for example, a CPU 601, a memory 602, an external storage device 603, a wireless communication unit 604, a GNSS receiving unit 605, and a CAN (Car Area Network) interface 606. Note, in FIG. 13, the hardware components related to the parking management system 100B are extracted and illustrated, and the hardware configuration of the onboard device 6 is not limited to that illustrated in FIG. 13.

The CPU 601, the memory 602, and the external storage device 603 are similar to the CPU 101, the memory 102, and the external storage device 103, respectively, and thus will not be described. The external storage device 603 stores a client application program for the parking management system 100B.

The wireless communication unit 604 is, for example, a wireless communication circuit corresponding to a mobile communication system such as 5G (5th Generation), LTE (Long Term Evolution), LTE-Advanced, and 3G, or a wireless communication circuit such as WiFi. The wireless communication unit 604 is used for communication with center server 1.

In the second embodiment, the GNSS receiving unit 605 receives the signal from the GPS satellite and the signal from the MICHIBIKI according to an instruction from the CPU 601 or at a predetermined period, and acquires the position information using the two signals. The GNSS receiving unit 605 outputs the position information to the CPU 601.

The CAN interface 606 is an interface connected to a CAN N3 to which other devices in the vehicle 60 are connected. The CPU 601 receives various types of information from the other devices through CAN N3, and determines, for example, a running state of vehicle 60, an opening and closing state of doors, and the like.

Figure 14:
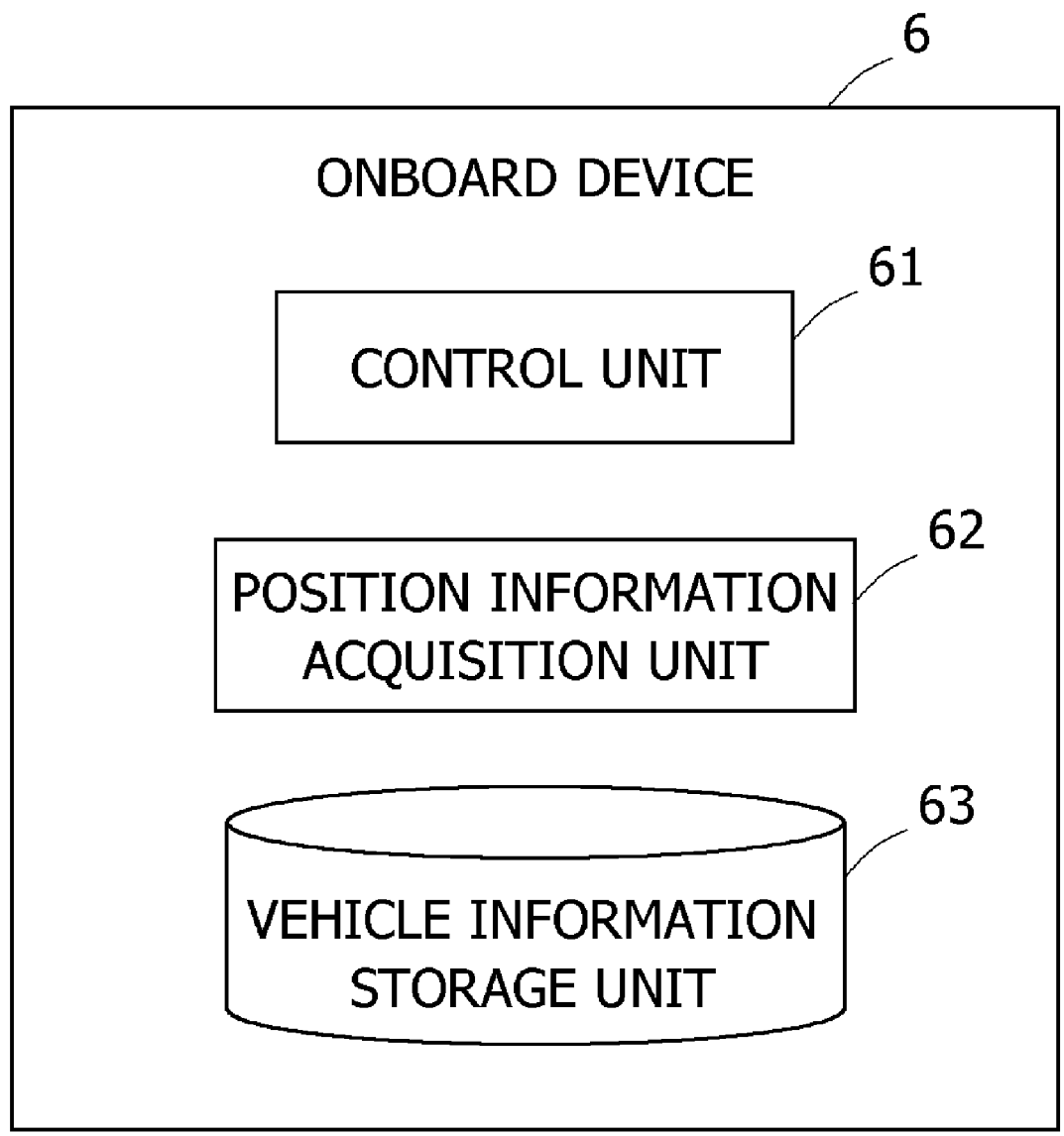
FIG. 14 is a diagram illustrating an exemplary functional configuration of an onboard device.

FIG. 14 is a diagram illustrating an exemplary functional configuration of the onboard device 6. The onboard device 6 includes, as the functional configuration, a control unit 61, a position information acquisition unit 62, and a vehicle information storage unit 63. These functional components are accomplished, for example, by the CPU 601 of the onboard device 6 executing the client application program in the parking management system 100B.

The control unit 61 performs communication control with the center server 1. For example, when detecting that the vehicle 60 is parked, the control unit 61 outputs an instruction to acquire position information to the position information acquisition unit 62, and acquires the position information from the position information acquisition unit 62. Next, the control unit 61 transmits a request for registering a parking slot to the center server 1 through the wireless communication unit 604. Along with the request for registering the parking slot, vehicle information of the vehicle 60 and the position information are also sent to the center server 1. The vehicle information is stored in the vehicle information storage unit 63, and is read by the control unit 61.

The control unit 61 detects that the vehicle 60 has been parked, for example, by detecting a stoppage of the motor or engine, and by satisfying one or more conditions, such as no change in the position information or changes of the position information that fall within a predetermined range. The conditions for detecting that the vehicle 60 is parked are not limited to these. For example, if a person is riding on the vehicle 60, the parking of vehicle 60 may be detected by detecting that the door of the vehicle 60 is opened or closed.

Upon receiving the instruction to acquire the position information from the control unit 61, the position information 62 transmits a request for acquiring the position information to the GNSS receiving unit 605, and receives the position information from the GNSS receiving unit 605. The position information acquisition unit 62 outputs the received position information to the control unit 61. The vehicle information storage unit 63 is created in a predetermined storage area of the external storage device 603, and stores the vehicle information of the vehicle 60. The content of the vehicle information stored in the vehicle information storage unit 63 is similar to that of the vehicle information of the first embodiment.

The hardware configuration and the functional configuration of the onboard device 6 are not limited to the examples illustrated in FIGS. 13 and 14. Further, in the second embodiment, the hardware configuration and the functional configuration of the center server 1 are similar to those of the first embodiment.

Figure 15:
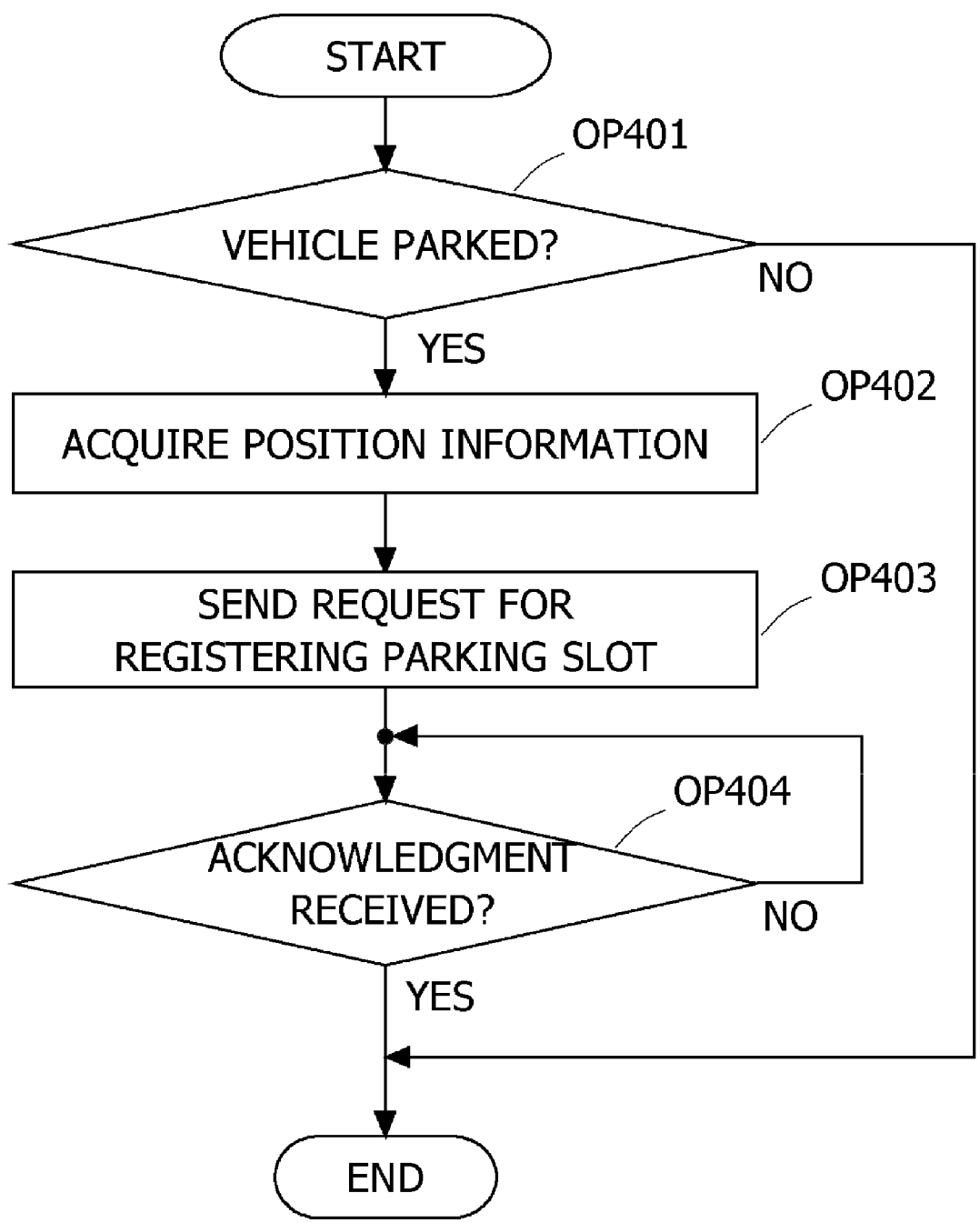
FIG. 15 is an exemplary flowchart of a process of registering a parking slot of a vehicle of an onboard device.

FIG. 15 is an exemplary flow chart of the process of registering the parking slot of the vehicle 60 of the onboard device 6. The processing illustrated in FIG. 15 is repeatedly executed at a predetermined period. The executing entity of the process illustrated in FIG. 15 is the CPU 601 of the onboard device 6, but for convenience will be described in terms of the functional components as the executing entity of the process.

In OP401, the control unit 61 determines whether the vehicle 60 has been parked. If it is detected that the vehicle 60 is parked (OP401: YES), the process proceeds to OP402. If the parking of the vehicle 60 has not been detected (OP401: NO), the process illustrated in FIG. 15 ends.

In OP402, the control unit 61 outputs the instruction to acquire the position information to the position information acquisition unit 62, and acquires the position information from the position information acquisition unit 62. In OP403, the control unit 61 reads the vehicle information from the vehicle information storage unit 63, and transmits a request for registering the parking slot, the vehicle information of the vehicle 60, and the position information to the center server 1 through the wireless communication unit 604.

In OP404, the control unit 61 determines whether or not an acknowledgement to the request for registering the parking slot has been received from the center server 1 through the wireless communication unit 604. If the acknowledgment to the request for registering the parking slot is received from the center server 1 (OP404: YES), the process illustrated in FIG. 15 is ended. If no acknowledgment to the request for registering the parking slot has been received from the center server 1 (OP404: NO), the control unit 61 is in the standby status. For example, if the acknowledgement to the request for registering the parking slot is not received after a predetermined period of time has elapsed, the process of FIG. 15 may be ended.

According to the second embodiment, even the autonomous vehicle 60, equipped with the onboard device 6 having a position information acquiring function and a communication function, is able to identify a parking slot. In the second embodiment, the parking slot of the vehicle 60 can be identified and registered without intervention of a human. Further, in the second embodiment, the autonomous vehicle 60 has been described, but the parking management system 100B according to the second embodiment may also manage a connected car including a data communication device having a function of acquiring position information and a function of communicating.

OTHER EMBODIMENTS

The embodiments described above are examples, and the present disclosure may be changed and carried out as appropriate without departing from the gist of the present disclosure.

In the first embodiment and the second embodiment, a parking slot in which a vehicle is parked is identified based on position information of the vehicle at one point in time, but position information at a plurality of points in time may be used to identify the parking slot in which the vehicle is parked. However, plural pieces of position information of the vehicle re acquired within a predetermined length of time. In this instance, the center server 1 identifies, for each of the plural pieces of position information at each time point, a parking slot with the smallest distance to a representative coordinate, and identifies a parking slot with the largest number of times identified as the parking slot where vehicle is parked.

The processes and embodiments described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising:
a processor configured to:
acquire position information acquired by a terminal worn by a user on a vehicle or by a terminal on the vehicle as position information of the vehicle, and
identify a first parking slot in which the vehicle is parked based on a plurality of pieces of position information of a parking slot for each of a plurality of parking slots included in a parking lot and the position information of the vehicle, wherein
the position information of the parking slot is position information of a predetermined position within the parking slot, and
the predetermined position within the parking slot is a position shifted a predetermined distance to driver's side of a vehicle to be parked from a center of the parking slot.

2. The information processing apparatus according to claim 1, further comprising a storage storing the plurality of pieces of the position information of the parking slot for each of the plurality of parking slots.

3. The information processing apparatus according to claim 1, wherein the predetermined distance is based on at least one of a position of a driver's seat of the vehicle to be parked and a size of the vehicle to be parked in the parking slot.

4. The information processing apparatus according to claim 1, wherein the processor is configured to identify a parking slot where a distance between a position indicated by the position information of the parking slot and a position indicated by the position information of the vehicle is the smallest among the plurality of the parking slots as the first parking slot.

5. The information processing apparatus according to claim 4, wherein the processor is configured to:
perform acquisition of the position information of the vehicle more than once to acquire a plurality of pieces of the position information of the vehicle, and
identify a parking slot having the largest number of times that the distance between the position indicated by the position information of the parking slot and the position indicated by the position information of the vehicle is the smallest among the plurality of the parking slots, for each of the plurality of pieces of the position information of the vehicle.

6. The information processing apparatus according to claim 1, wherein the processor is configured to transmit information regarding the first parking slot and at least one of second parking slots adjoining the first parking slot to a terminal used by the user.

7. The information processing apparatus according to claim 1, wherein the position information of the vehicle acquired by the terminal on the vehicle is position information acquired when the vehicle is detected to be parked.

8. The information processing apparatus according to claim 1, wherein the position information of the vehicle is acquired by the terminal worn by the user or by the terminal on the vehicle by using a first signal from a first satellite and a second signal from a second satellite.

9. The information processing apparatus according to claim 8, wherein the position information of the parking slot is position information acquired by using the first signal from the first satellite and a third signal from the second satellite, the third signal being more accurate than the second signal.

10. An information processing system comprising:
a terminal worn by a user on a vehicle or a terminal on the vehicle, each of which acquires position information, and
an information processing apparatus including a processor configured to:
acquire the position information as position information of the vehicle, and
identify a first parking slot in which the vehicle is parked based on a plurality of pieces of position information of a parking slot for each of a plurality of parking slots included in a parking lot and the position information of the vehicle,
wherein the position information of the parking slot is position information of a position shifted a predetermined distance to driver's side of a vehicle to be parked from a center of the parking slot.

11. The information processing system according to claim 10, wherein the processor is configured to identify a parking slot where a distance between a position indicated by the position information of the parking slot and a position indicated by the position information of the vehicle is the smallest among the plurality of the parking slots as the first parking slot.

12. The information processing system according to claim 11, wherein the processor is configured to:
perform acquisition of the position information of the vehicle more than once to acquire a plurality of pieces of the position information of the vehicle, and
identify a parking slot having the largest number of times that the distance between the position indicated by the position information of the parking slot and the position indicated by the position information of the vehicle is the smallest among the plurality of the parking slots, for each of the plurality of pieces of the position information of the vehicle.

13. The information processing system according to claim 10, wherein the processor is configured to transmit information regarding the first parking slot and at least one of second parking slots adjoining the first parking slot to a terminal used by user.

14. The information processing system according to claim 10, wherein
when the vehicle is detected to be parked, the terminal on the vehicle acquires the position information.

15. The information processing system according to claim 10, wherein the terminal worn by the user or the terminal on the vehicle acquires the position information by using a first signal from a first satellite and a second signal from a second satellite.

16. The information processing system according to claim 15, wherein the position information of the parking slot is position information acquired by using the first signal from the first satellite and a third signal from the second satellite, the third signal being more accurate than the second signal.

17. An information processing method executed by a computer, comprising:
acquiring position information acquired by a terminal worn by a user on a vehicle or a terminal on the vehicle as position information of the vehicle, and
identifying a first parking slot in which the vehicle is parked based on a plurality of pieces of position information of a parking slot for each of a plurality of parking slots included in a parking lot and the position information of the vehicle, wherein
the position information of the parking slot is position information of a predetermined position within the parking slot, and
the predetermined position within the parking slot is a position shifted a predetermined distance to driver's side of a vehicle to be parked from a center of the parking slot.

* * * * *